United States Patent [19]
Kurozasa

[11] Patent Number: 5,940,188
[45] Date of Patent: Aug. 17, 1999

[54] IMAGE PROCESSING AND COMMUNICATING APPARATUS THAT ALLOWS PROCESSING ACCORDING TO FUNCTION OF EXTERNAL APPARATUS AND IMAGE COMMUNICATION METHOD

[75] Inventor: Yoshiharu Kurozasa, Yokohama, Japan

[73] Assignee: Minolta Co., Ltd., Osaka, Japan

[21] Appl. No.: 08/768,968

[22] Filed: Dec. 18, 1996

[30] Foreign Application Priority Data

Dec. 26, 1995 [JP] Japan ................................. 7-338938

[51] Int. Cl.⁶ ....................................................... H04N 1/00
[52] U.S. Cl. ........................ 358/436; 358/437; 358/438; 358/468; 382/317; 399/84
[58] Field of Search ...................... 358/400–404, 358/434, 443–444, 426, 468, 448, 436–438; 345/433; 399/84, 8; 382/317

[56] References Cited

U.S. PATENT DOCUMENTS

| | | | |
|---|---|---|---|
| 4,675,908 | 6/1987 | Saito et al. ............................. | 382/298 |
| 4,823,193 | 4/1989 | Takahashi ............................... | 358/434 |
| 5,689,755 | 11/1997 | Ataka ............................................ | 399/8 |
| 5,699,170 | 12/1997 | Yokose et al. .......................... | 358/426 |
| 5,757,379 | 5/1998 | Saito ....................................... | 345/433 |

FOREIGN PATENT DOCUMENTS

| | | | |
|---|---|---|---|
| 4-137861 | 5/1992 | Japan .............................. | H04N 1/387 |
| 4-360293 | 12/1992 | Japan ............................... | G06K 7/10 |
| 5-135140 | 6/1993 | Japan ............................... | G06F 15/62 |

*Primary Examiner*—Leo H. Boudreau
*Assistant Examiner*—Ishrat Sherali
*Attorney, Agent, or Firm*—Burns, Doane, Swecker & Mathis, LLP

[57] ABSTRACT

An operator carrying out a copy request through facsimile communication sets originals with a mark sheet at the beginning in a facsimile apparatus. Items of functions included in the facsimile apparatus of a destination side (number of copies, sheet size and the like) are entered in advance in the mark sheet. The operator of the copy request can specify the number of copies, sheet size and the like to be reproduced at the facsimile apparatus of the reception side by marking appropriate items in the mark sheet.

20 Claims, 35 Drawing Sheets

FIG. 15

| COPY PROCESS ITEM / FACSIMILE NUMBER | 1 | 2 | 3 | 4 | 5 | 6 | 7 | 8 | 9 | 0 |
|---|---|---|---|---|---|---|---|---|---|---|
| 06-123-4567 | ○ | ○ | ○ | × | ○ | × | × | × | × | × |
| 06-234-5678 | × | ○ | ○ | × | ○ | × | × | × | × | × |
| | | | | | | | | | | |
| | | | | | | | | | | |

IMAGE PROCESSING AND COMMUNICATING APPARATUS THAT ALLOWS PROCESSING ACCORDING TO FUNCTION OF EXTERNAL APPARATUS AND IMAGE COMMUNICATION METHOD

BACKGROUND OF THE INVENTION

1. Field of the Invention

The present invention relates to an image processing apparatus that carries out image data communication, and an image communication method. More particularly, the present invention relates to an image processing apparatus that transmits image data together with information for controlling a destination facsimile apparatus, and an image communication method.

2. Description of the Related Art

In facsimile communication, apparatuses are disclosed that transmit image data and information to an external apparatus for controlling the external apparatus as set forth in the following.

(1) Japanese Patent Laying-Open No. 4-360293 discloses an apparatus that transmits an OMR (optical mark reader) sheet together with an original as image data to a mail center for image processing. At the mail center, a timing mark provided in the image data of an OMR sheet is identified to recognize that the image data corresponds to an OMR sheet. The service information recorded on the OMR sheet is analyzed. The original image data thereof is sent to a corresponding service execution unit. The executed service includes broadcasting communication service, confidential service, and the like.

(2) Japanese Patent Laying-Open No. 4-137861 discloses an image forming apparatus that has a portion of an image region to be transmitted determined as a region for designating an image process to identify information such as a mark assigned in that region at the time of image reception to carry out image processing according to the result. By transmitting image data with a mark assigned in a predetermined region, a number of copies according to the mark can be provided at the facsimile apparatus of the reception side.

Problems of the above apparatuses will be described hereinafter. When process information for processing image data is transmitted by a facsimile apparatus of the transmission side, the process requested by the transmitter will not be carried out at the receiver side if the apparatus of the reception side cannot recognized the transmitted process information.

The same can be said in the case where the process requested by the transmitter cannot be reproduced at the receiver if the facsimile apparatus of the reception side lacks the processing ability.

Although there are some facsimile apparatuses that carry out the process requested by the transmitter, if not possible at the receiver side, by another function as an alternative, the print out image will be one that does not correspond to that intended of the transmitter. Furthermore, the receiver cannot recognized the image intended by the sender of the transmission side.

In order to prevent such problems, the original had to be transmitted after the sender has converted the original into an image format that is to be reproduced at the receiving side. For example, when five copies of an original in A4-size are required at the receiving side, the sender of the transmitting side must first obtain five copies of that original in A4-size by another copy machine, and then transmit all the five copies via the facsimile apparatus.

Although the desired image will be output at the receiver side, the amount of data to be transmitted is increased to induce the problem of high cost transmission. Furthermore, the load of the sender at the transmitting side is increased due to implementing a plurality of copies. This is particularly significant in the case where transmission is to be carried out from one transmission facsimile apparatus to a plurality of receiver facsimile apparatuses.

SUMMARY OF THE INVENTION

In view of the foregoing, an object of the present invention is to provide a facsimile apparatus that can reduce the load of the sender transmitting an original.

Another object of the present invention is to reduce transmission data in facsimile communication.

A further object of the present invention is to provide a facsimile apparatus that carries out a process at a facsimile apparatus of a receiver side according to process information (information for processing image data sent by communication such as the number of copies, sheet size, and the like) transmitted from an external facsimile apparatus when the facsimile apparatus of the receiver side has the ability to recognize the process information, and that can properly transmit information associated with the process requested by the sender of the transmission side to the receiver side even when the facsimile apparatus of the receiver side lacks the ability to recognize the process information.

According to an aspect of the present invention, an image processing apparatus that allows image communication with an external image processing apparatus includes a unit for storing function information of image process of the external image processing apparatus, a unit for entering information of image process applied on original image data to be transmitted to the external image processing apparatus, an image processing unit for image-processing the original image data according to entered information and function information of the external image processing apparatus, and a transmission unit for transmitting the image-processed original image data and to the external image processing apparatus.

According to another aspect of the present invention, an image processing apparatus that allows image communication with an external image processing apparatus includes a unit for storing function information of image process of the external image processing apparatus, a unit for entering image process information applied on original image data that is to be transmitted to the external image processing apparatus, an image processing unit for comparing the entered information with the function information of the external image processing apparatus for image-processing the original image data according to information of the image process that cannot be processed by the external image processing apparatus out of the entered information, and a transmission unit for transmitting the image-processed original image data and information of the image process that can be processed by the external image processing apparatus to the external image processing apparatus.

According to a further aspect of the present invention, an image processing apparatus that allows image communication with an external image processing apparatus includes a memory unit for storing function information of image process of the external image processing apparatus, a unit for entering information of image process applied on original image data that is to be transmitted to the external image processing apparatus, a unit for comparing the entered information with the function information of the external image processing apparatus for converting information of the image process that cannot be processed by the external image processing apparatus out of the entered information into image data, and a transmission unit for transmitting the converted image data, the original image data, and the entered information to the external image processing apparatus.

According to still another aspect of the present invention, an image processing system allows communication between a first image processing apparatus and a second image processing apparatus. The first image processing apparatus includes a unit for obtaining function information of image process of the second image processing apparatus by communication, a unit for entering information of image process applied on original image data that is to be transmitted to the second image processing apparatus, a unit for comparing the entered information with the function information of the second image processing apparatus for converting information that cannot be processed by the second image processing apparatus out of the input information into image data, and a communication unit for transmitting the original image data, the converted image data, and the function information that can be processed by the second image processing apparatus out of the entered information to the second image processing apparatus.

The second image processing apparatus includes an image processing unit for applying an image process on the original image data according to information transmitted by the first image processing apparatus, and a unit for providing image-processed original image data and the converted image data.

According to a further aspect of the present invention, an image processing apparatus that allows image communication with an external image processing apparatus includes memory means for storing function information of image process of the external image processing apparatus, an instructing unit for instructing that a plurality of copies of the original data to be transmitted to the external image processing apparatus are to be printed out, a unit for determining whether a plurality of copies can be printed out by the external image processing apparatus according to the function information of the external image processing apparatus, and notifying, if not executable, that a plurality of copies of print out is required to an operator at the external processing apparatus side, and a transmission unit for transmitting the produced image data, and the original image data to the external image processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows destination facsimile numbers and registration of corresponding copy process items.

DESCRIPTION OF THE PREFERRED EMBODIMENTS

Figure 1:
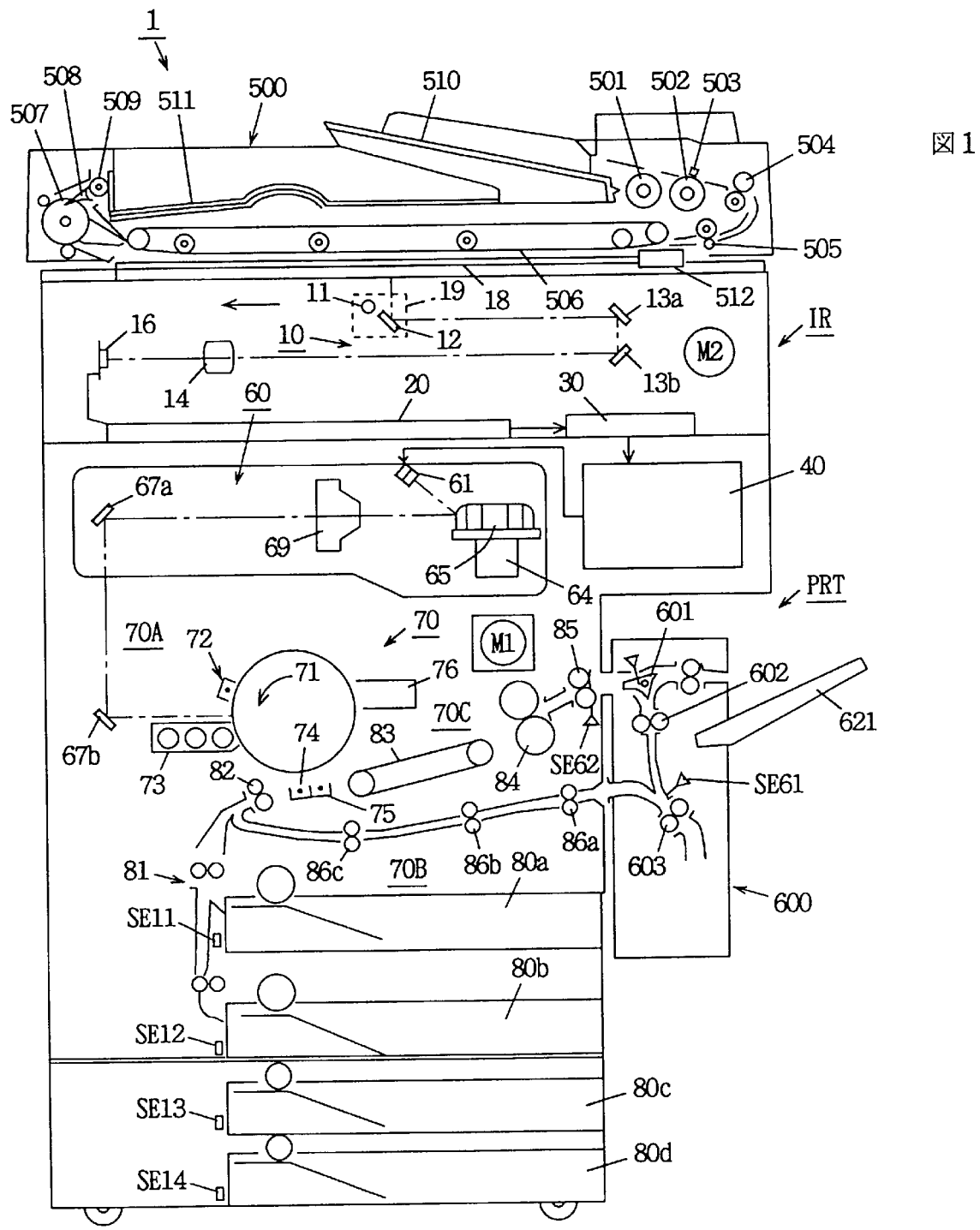
FIG. 1 is a front sectional view of a facsimile apparatus according to a first embodiment of the present invention.

Embodiments of the present invention will be described hereinafter with reference to the drawings. Likewise reference characters in the drawings indicate likewise or corresponding components.

FIRST EMBODIMENT

A. Structure of Apparatus

FIG. 1 is a sectional front view showing the entire structure of a facsimile apparatus according to a first embodiment of the present invention. The facsimile apparatus is implemented by connection of components set forth in the following.

(1) Scan System 10

A scan system 10 functions to convert the read out original into image signals. Scan system 10 includes an exposure lamp 11 built in a scanner 19 that moves beneath platen glass 18, a first mirror 12, second and third mirrors 13a and 13b, a converge lens 14, a photoelectric conversion element 19 employing a CCD array and the like, and a scan motor M2.

(2) Image Signal Processing Unit 20

An image signal processing unit 20 functions to process image signals sent from scan system 10. Image signal processing unit 20 processes an image signal provided from photoelectric conversion element 16, and provides image data to a memory unit 30. Image signal processing unit 20 includes an A/D converter, a shading correction unit, a variable scale magnification processing unit, and a picture quality correction unit and the like. An image signal input from photoelectric conversion element 16 is A/D converted and quantitized into image data of 8 bits for each pixel, and then subjected to various processes such as shading correction, variable scale magnification, and picture quality correction to be eventually output as image data.

(3) Memory Unit 30

A memory unit 30 provides control for outputting the image data from image signal processing unit 20 directly to a printer apparatus, or to store the image data in a memory. Memory unit 30 includes a switching unit, a binarization processing unit for generating binary data according to parameter settings input from a control unit CPU 104 (described afterwards), a multiport image memory 125 having a capacity of 2 pages in A4 size at 400 dpi, a code processing unit with a compressor and expander that can operate independently, a code memory 126 with a multiport, a rotary processing unit, a multi-value processing unit for generating multi-value data according to a parameter setting from CPU 104, and the like. Control unit CPU 104 provides the overall control of the units in memory unit 30.

(4) Print Processing Unit 40

A print processing unit 40 drives a semiconductor laser 61 according to image data output from memory unit 30.

(5) Facsimile Conversion Unit 41 (not shown)

A facsimile conversion unit 41 sends/receives image data to/from memory unit 30 in facsimile operation.

Facsimile conversion unit 41 is located between memory unit 30 and a G3 unit 42 for carrying out format conversion of image information in transmission and reception. Format conversion of image information includes, for example, (a) conversion of pixel density of image data, (b) magnification and reduction of image data, (c) conversion of bit width of code data, and (d) conversion of coding method of code data. These processes are carried out by control unit CPU 104.

(6) G3 unit 42 (not shown)

G3 unit 42 carries out communication control such as modulation/demodulation of image data and a control signal in facsimile operation. Furthermore, G3 unit 42 is connected to a telephone line communication control with the telephone line network.

(7) Laser Optical System 60

A laser beam from semiconductor laser 61 is directed to an exposure position of a photoreceptor drum 71. Laser optical system 60 includes semiconductor laser 61, a polygon mirror 65 for deflecting a laser beam, a main lens 69, a reflective mirror 67a, a reflective mirror 67b, and the like.

(8) Image Formation System 70

An image formation system 70 develops an exposed latent image and transfers the image on an recording sheet. Then, a fixing process is applied to form an image.

Image formation system 70 is mainly constituted by a develop transfer system 70A, a transportation system 70B, and a fixing system 70C.

Develop transfer system 70A includes a photoreceptor drum 71 that is rotary driven in a counterclockwise direction with respect to FIG. 1, and a corona charger 72, a developer 73, a transfer charger 74, a separation charger 75, and a cleaning unit 76 which are arranged around photoreceptor 71 in order from the upstream side.

A two-component developer agent of black toner and carrier is accommodated in developer 73.

Transportation system 70B includes cassettes 80a–80d for accommodating recording sheets, size detection sensors SE11–SE14 for detecting the size of a recording sheet, a recording sheet guide 81, a timing roller 82, a transport belt 83, and horizontal transport rollers 86a, 86c for conveying transported recording sheet.

Fixing system 70C includes a fixing roller 84 that transports a recording sheet on which a toner image is formed while applying thermal-compression, a discharge roller 85, and a discharge sensor SE62 for detecting discharge of a fixing-processed recording sheet.

A reader device IR is formed of the above-described scan system 10 and image signal processing unit 20. A printer apparatus PRT is formed of print processing unit 40, laser optical system 60, and image formation system 70, and the like.

(9) Image transportation unit 500

An image transportation unit 500 transports an original and reverses the side faces of an original, if necessary. Original transportation unit 500 automatically conveys an original set on an original feed tray 510 onto platen glass 18. The original read out by scanner 19 is discharged to an original discharge unit 511.

Original transportation unit 500 includes an original feed tray 510 for setting an original, an original discharge unit 511 to which an original is discharged, a feed roller 501 for feeding an original one sheet at a time, a sorter roller 502, a sorter pad 503, an intermediate roller 504 for transporting an original, a resist roller 505, a transport belt 506, a reverse roller 507, a switching claw 508, a discharge roller 509, and an original scale 512 provided on platen glass 18 which is the reference for the original positioning.

(10) Refeeder Unit 600

A refeeder unit 600 carries out the operation to supply a recording sheet to a retransfer position. Refeeder unit 600 temporarily accommodates a recording sheet discharged from discharge roller 85 to reverse the side faces when in a duplex side mode, and not in a combined mode, to supply a sheet to horizontal transport roller 86a of transportation system 70B for image formation again. Refeeder unit 600 includes a switching claw 601 for switching the direction of a recording sheet to discharge tray 621 or to a refeed transportation path, a transport roller 602, a reverse roller 603, and a reverse sensor SE61.

(11) Operation Panel OP (not shown in FIG. 1).

An operation panel OP is provided at the top surface of the main body of a facsimile apparatus to enter process information by the user.

Figure 2:
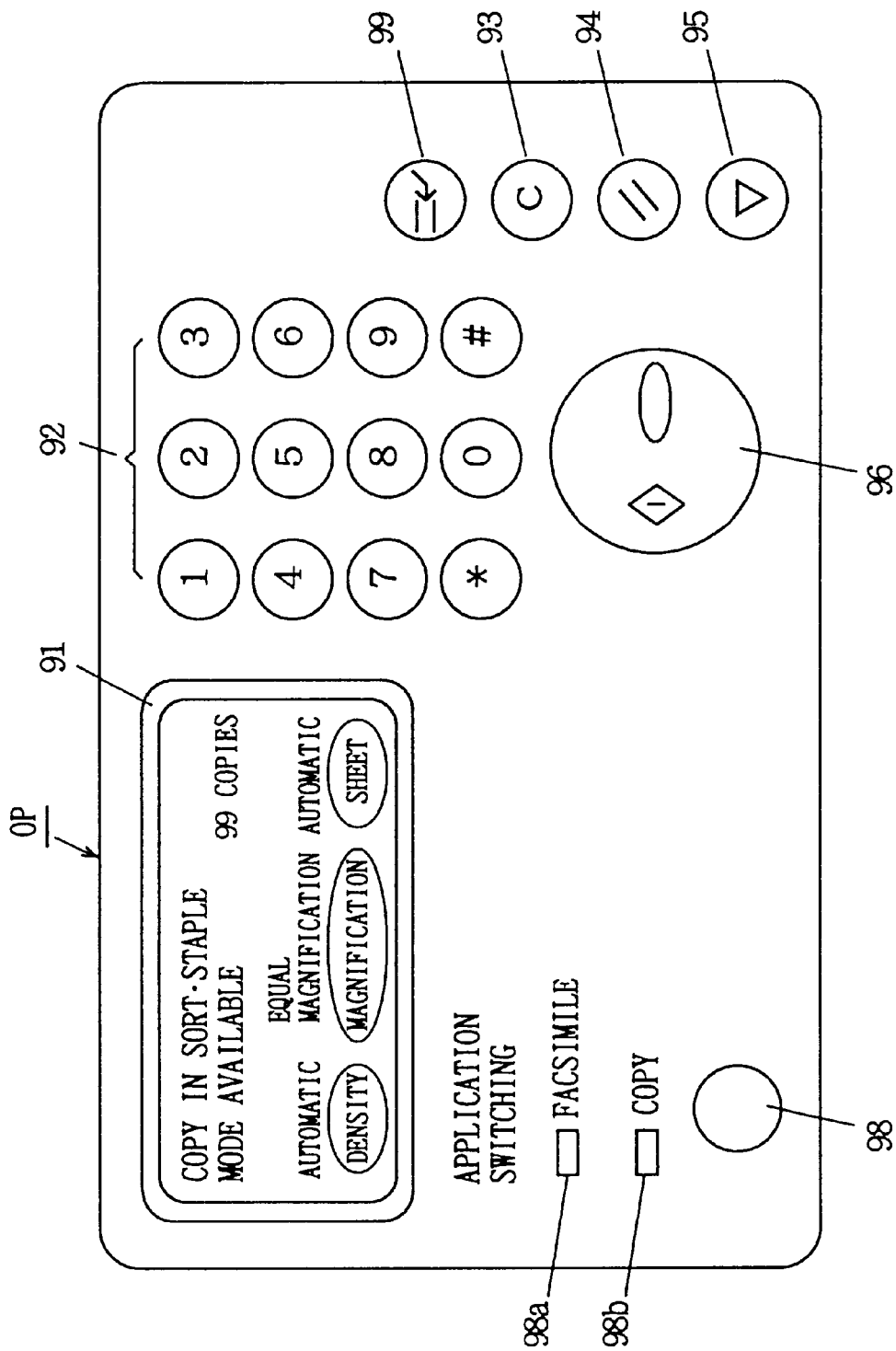
FIG. 2 is a front view of an operation panel OP of the facsimile apparatus of the first embodiment.

FIG. 2 is a plan view showing the appearance of operation panel OP.

Referring to FIG. 2, operation panel OP includes a liquid crystal touch panel 91 formed on a liquid crystal display screen, a ten key 92 for entering numeric value such as the ten key for setting the number of copies or magnification scale, or the facsimile number of the receiver, a clear key 93 for restoring the values of the ten key and the like to the default value of 1, a panel reset key 94 for restoring the values set in the copying apparatus to respective default values, a stop key 95 for inhibiting a copy operation and a facsimile operation, a start key 96 for initiating a copy operation and a facsimile operation, and an interruption key 99 for carrying out a copy or facsimile operation interruptively during copy or automatic printing.

Operation panel OP further includes an application switching key 98 for switching between a facsimile mode and a copy mode, a display unit 98a that is lit when facsimile mode is selected, and a display unit 98b lit when a copy mode is selected.

Liquid crystal touch panel 91 provides display of the operation state of a copying apparatus such as exposure level, copy magnification scale, recording sheet size, various abnormal states of the copying apparatus such as jam occurrence, service man call, paper empty, and the like, the facsimile number of the receiver, transmission resolution, the facsimile mode such as polling, the operation state of facsimile during communication, and other information. Furthermore, the user can specify an automatic select mode of a copy operation such as the copy density, copy magnification, and recording sheet size and a facsimile operation such as the transmission resolution.

(12) Control Unit 100 (not shown in FIG. 1)

Figure 3:
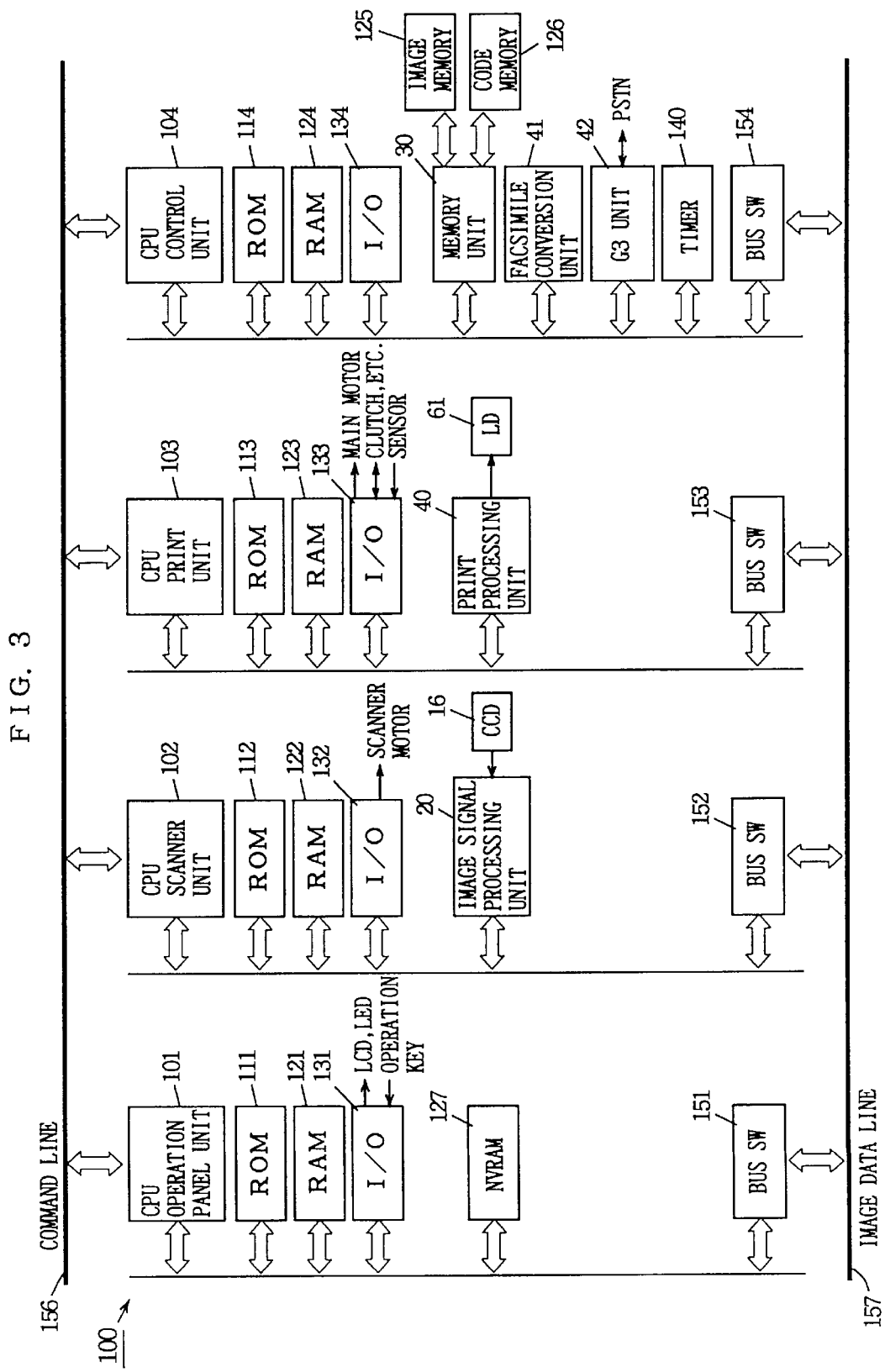
FIG. 3 is a block diagram showing a structure of a CPU of the facsimile apparatus of the first embodiment.

A control unit 100 provides the overall control of the apparatus. FIG. 3 is a block diagram showing a specific structure of control unit 100 in the facsimile apparatus of FIG. 1.

Referring to FIG. 3, control unit 100 includes an operation panel unit CPU 101 for operation of the panel, a scanner unit CPU 102 for controlling the scanner (reader device IR), a print unit CPU 103 for controlling the print unit (printer device PRT), and a control unit CPU 104 for controlling G3 unit 42 and facsimile conversion unit 41.

Each of CPUs 101–104 includes ROMs 111–114, respectively, for storing programs to control respective CPUs, RAMs 121–124 forming the memory region of the working area for respective CPUs, I/Os 131–134 for exchanging information with an external apparatus of respective CPUs, and bus switches (BUS SW) 151–154 for transferring image data via an image data line 157.

Each of CPUs 101–104 is connected by a command line 156 such that exchange of required command information is carried out.

An NVRAM 127 storing contents of a screen displayed on the liquid crystal touch panel is connected to operation panel unit CPU 101.

Image signal processing unit 20 is connected to scanner unit CPU 102. Photoelectric conversion element (CPD array and the like) 16 is connected to image signal processing unit 20.

Print processing unit 40 is connected to print unit CPU 103. Semiconductor laser diode (LD) 61 is connected to print processing unit 40.

Control unit CPU 104 is connected to memory unit 30, facsimile conversion unit 41, G3 unit 42, and timer 140. Image memory 125 and code memory 126 are connected to memory unit 30.

The operation of each of CPUs 101–104 will be described hereinafter.

(a) Operation Panel Unit CPU 101

CPU 101 carries out the input process from various operation keys of operation panel OP and the display process to the display unit (touch panel). Initial mode setting, total counter, and individual item counters are stored in NVRAM 127.

(b) Scanner Unit CPU 102

Scanner unit CPU 102 controls each unit of image signal processing unit 20 and the drive control of scan system 10.

(c) Print Unit CPU 103

Print unit CPU 103 carries out control of print processing unit 40, laser optical system 60, and image formation system 70.

(d) Control Unit CPU 104

Control unit CPU 104 carries out the process of the overall timing adjustment of control unit 101 and operation mode setting.

By controlling memory unit 30, CPU 104 temporarily stores the read out image data into image memory 125 and code memory 126. The stored data is read out, and provided to print processing unit 40 in the copy mode. During facsimile transmission, the read out data is provided to facsimile conversion unit 41, and then provided to a telephone line (PSTN) via G3 unit 42.

In facsimile reception, the received image data on the telephone line is temporarily stored in code memory 126 and image memory 125 via G3 unit 42 and facsimile conversion unit 41. The stored image data is read out and provided to print processing unit 40. In a facsimile mode, data conversion such as the pixel density conversion process between memory unit 30 and G3 unit 42 is carried out by control of facsimile conversion unit 41 according to control unit CPU 104.

B. Overall process flow of each CPU

The process carried out by each CPU will be described hereinafter.

(1) Operation panel unit CPU 101

Figure 4:
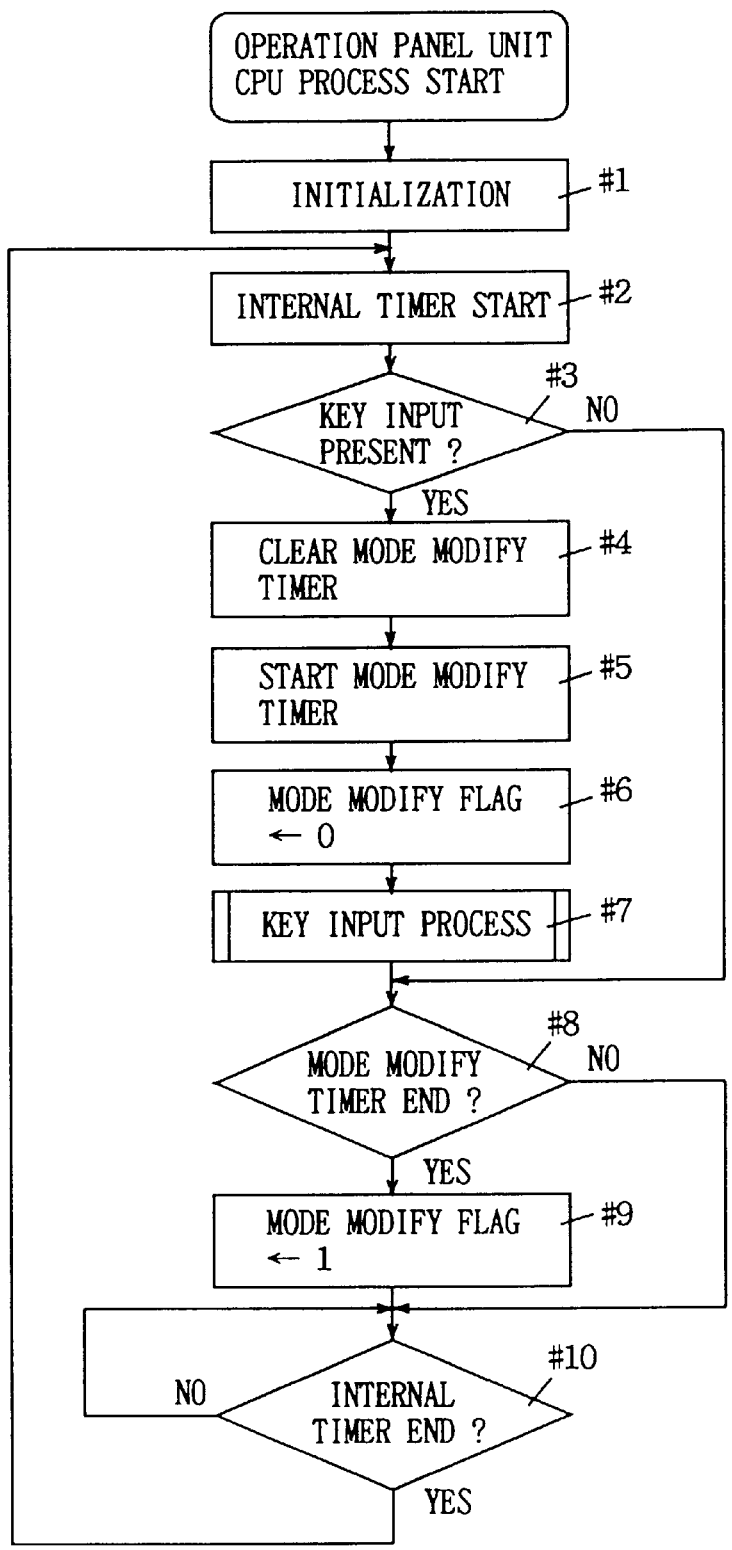
FIG. 4 is a flow chart for describing the process carried out by the CPU of the operation panel of the facsimile apparatus of the first embodiment.

FIG. 4 is a flow chart showing the process carried out by operation panel unit CPU 101.

When the power of the apparatus is turned on, an initialization routine is started at step #1, whereby the panel display program stored in ROM 111 and a facsimile basic screen (FIG. 7) which is the initial screen stored in NVRAM 127 are read in. The read in initial screen is displayed on liquid crystal touch panel 91 of operation panel OP.

At step #2, counting by an internal timer is initiated. The process from step #2 to #10 of the flow chart in FIG. 4 is repeated at a constant cycle. The internal timer sets this repeated time interval.

At step #3, determination is made whether there is a key input from operation panel OP. If YES at step #3, the value of the mode modify timer is cleared at step #4. This mode modify timer initiates counting when there is a key input from operation panel OP or when a copy operation ends. The mode of the facsimile apparatus enters a facsimile mode in response to elapse of counting by this timer. The time period for the count of the mode modify timer to end is, for example, ten minutes. The facsimile apparatus is set to a facsimile mode at elapse of ten minutes from the last key input or the last copy operation completion.

Following the process at step #4, the mode modify timer initiates counting at step #5. At step #6, the mode modify flag is set to 0.

The mode modify flag is set to 0 when it is determined that there is a key input at step #3, and set to 1 at the elapse of the mode modify timer. The facsimile mode is set in response to the mode modify flag taking the value of 1.

At step #7, a process according to the key input is executed. Details thereof will be described afterwards.

When NO at step #3, the processes from step #4 to #7 are not carried out.

At detection of elapse of the mode modify timer at step #8 (YES), the value of the mode modify flag is set to 1 at #9.

The process is suppressed until counting of the internal timer ends at step #10.

When expiration of the internal timer is detected at step #10, the process from step #2 is repeated.

Figure 5:
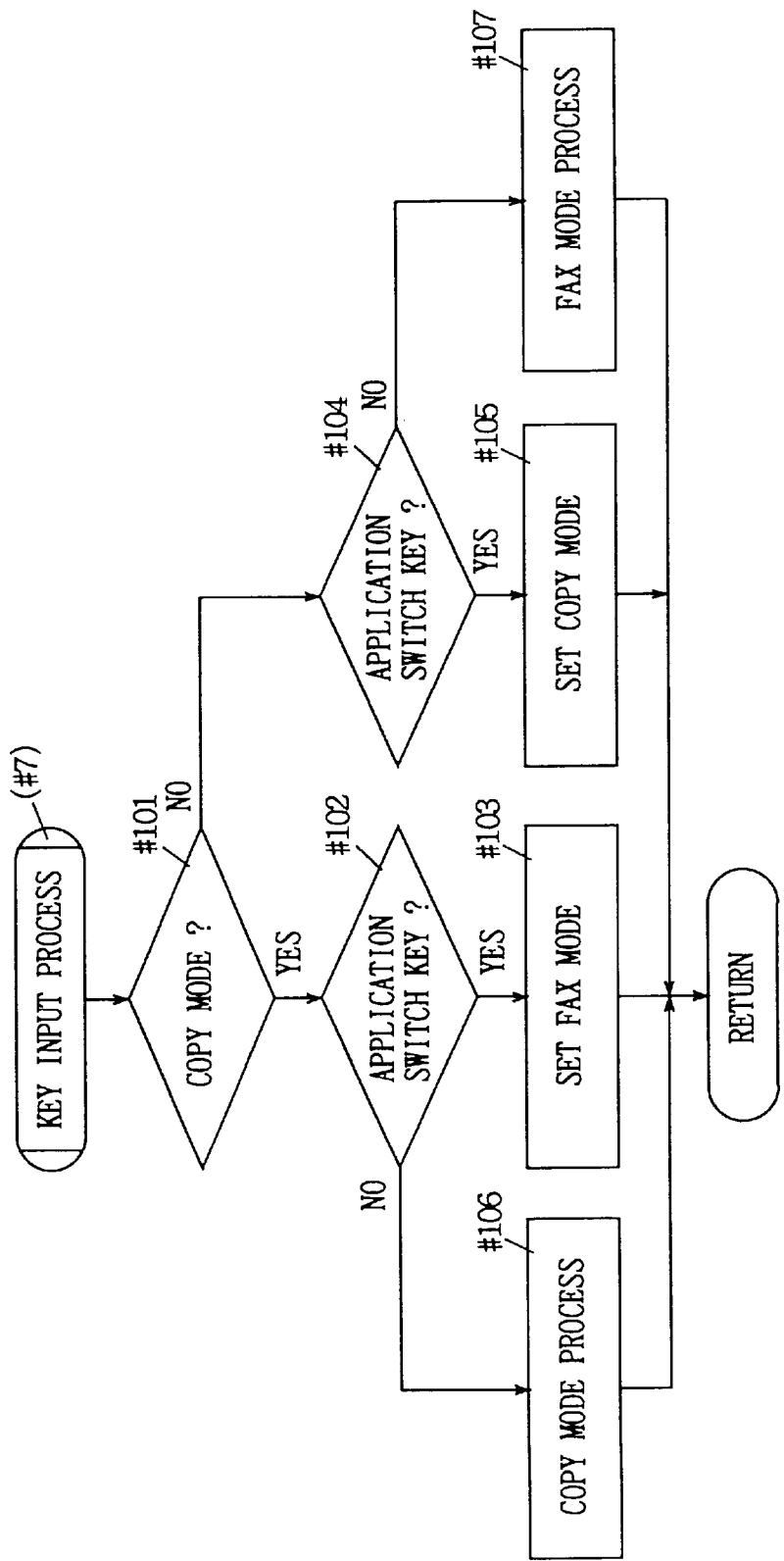
FIG. 5 is a flow chart indicating the key input process (#7) of FIG. 4.

FIG. 5 is a flow chart showing specific contents of the key input process of step #7 in FIG. 4.

At step #101, determination is made whether the current mode is a copy mode. If in the copy mode (YES at #101), the program proceeds to step #102 to determine whether the key input is an application switching key 98. If YES at step #102, a facsimile mode is set at #103. A basic screen (FIG. 7) for facsimile read out from NVRAM 127 is displayed on liquid crystal touch panel 91, and display unit 98a is lit.

If NO at step #101, determination is made whether the key input is an application switching key 98 at step #104. If YES at step 104, a copy mode is set at step #105. A copy operation screen read out from NVRAM 127 is displayed on liquid crystal touch panel 91, and display unit 98b is lit.

When determination is made that the key input detected at step #102 is not application switching key 98 (NO at step #102), the key input process (copy number input, copy execution) in the copy mode is carried out at step #106.

When determination is made that the key input detected at step #3 is not application switching key 98 at step #104 (NO at #104), the key input process in a facsimile mode is carried out at step #107.

Figure 6:
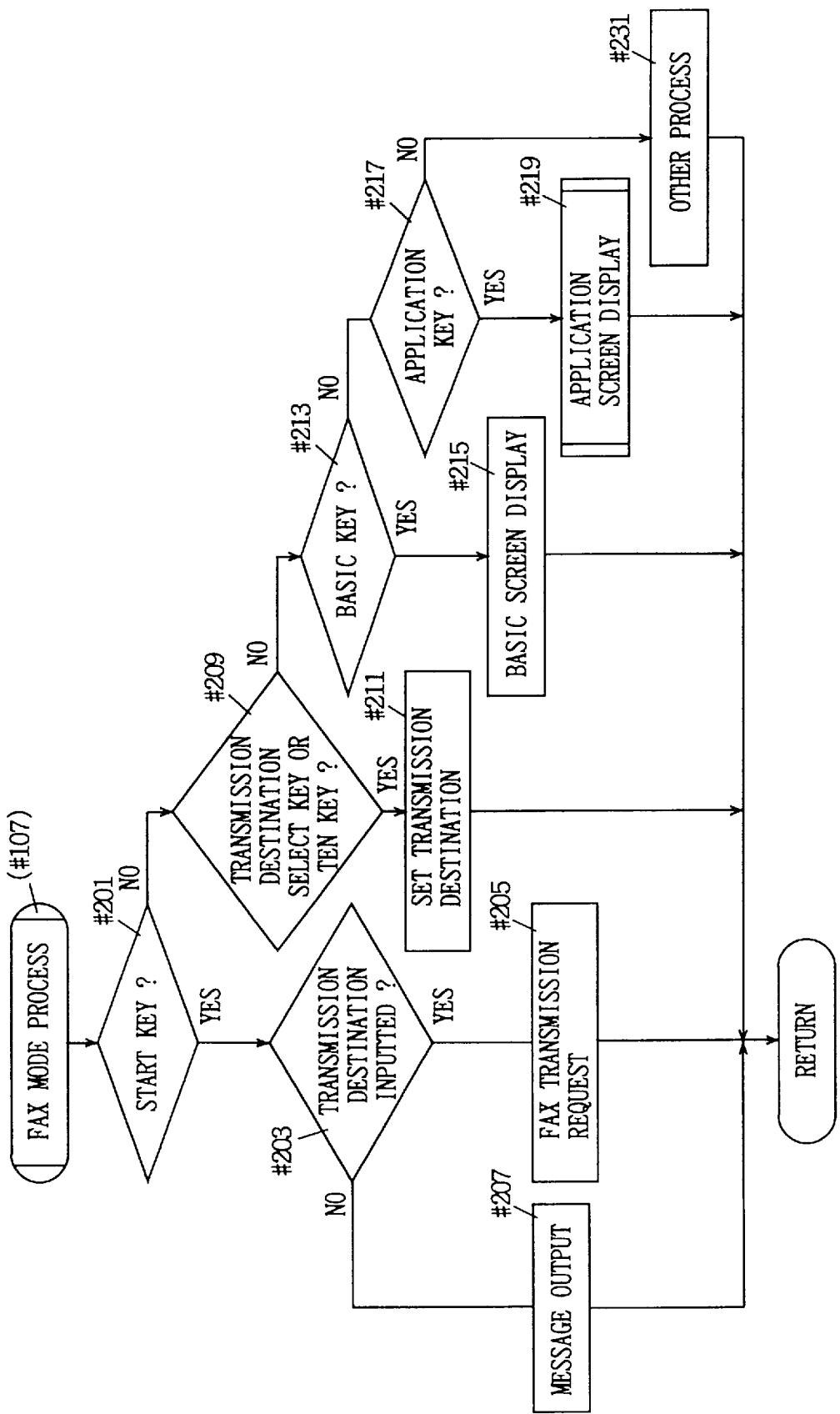
FIG. 6 is a flow chart showing specific contents of a facsimile mode process (#107) of FIG. 5.

FIG. 6 is a flow chart showing the contents of the key input process of a facsimile mode of step #107 in FIG. 5.

At step #201, determination is made whether the detected key is a start key or not. If YES at step #201, determination is made whether the destination party is input at step #203. If YES at step #203, a facsimile transmission request is output to control unit CPU 104 at step #205.

When No at step #203, a message prompting input of a destination party is provided at step #207.

When NO at step #201, determination is made whether the key input is a destination selection key (touch panel TP4 of FIG. 7) or a ten key at step #209. If YES at step #209, the destination is set according to the key input at step #211.

Figure 7:
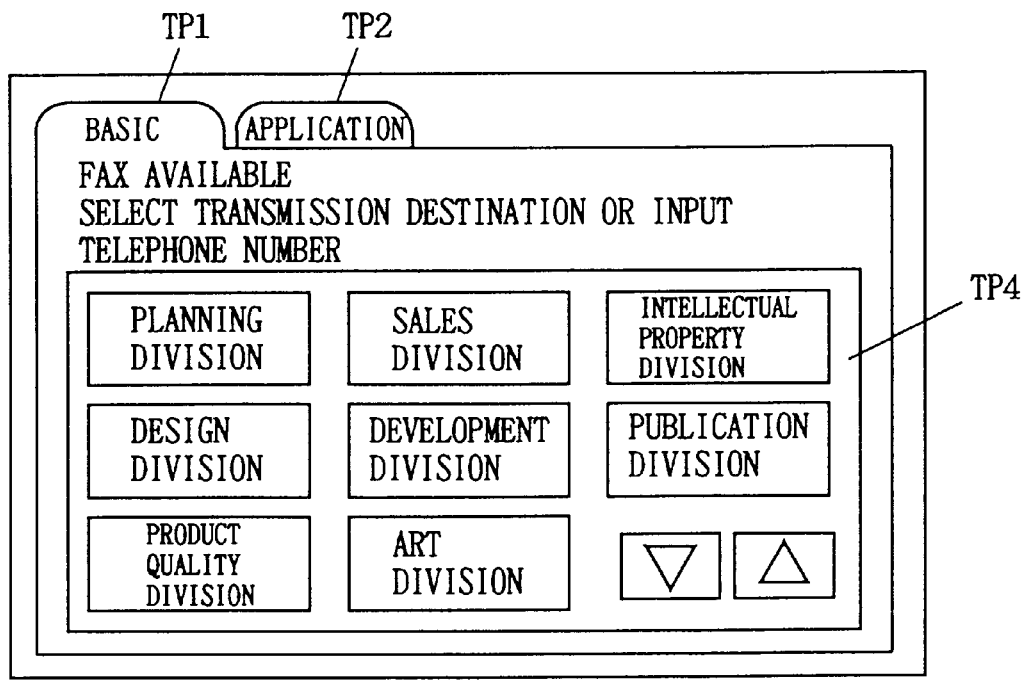
FIG. 7 is a diagram showing a facsimile basic screen displayed at step #219 of FIG. 6.
Figure 8:
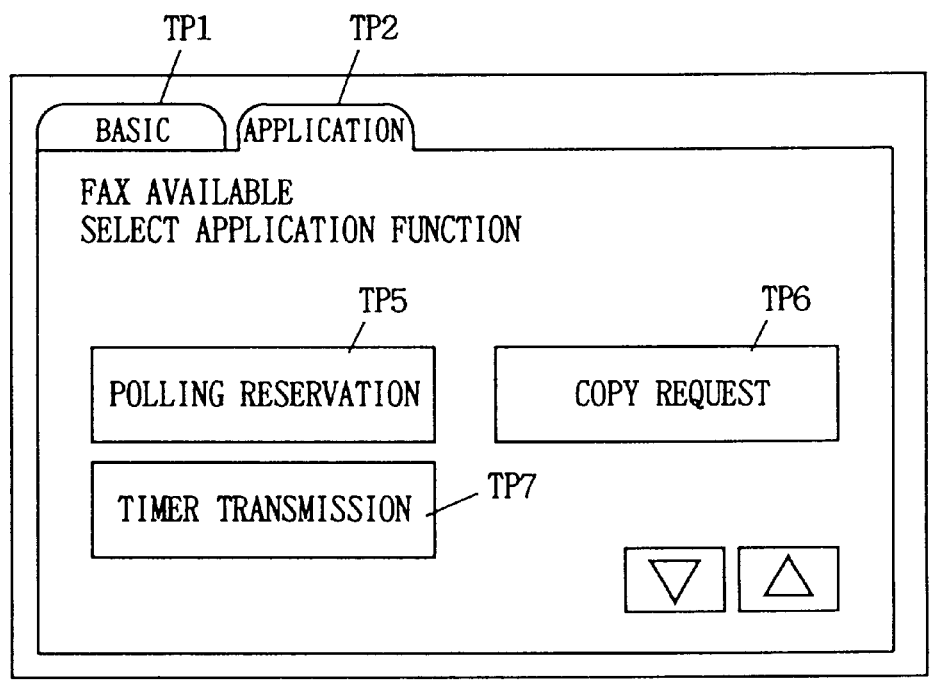
FIG. 8 shows a facsimile application screen displayed on an application image screen display (#219) of FIG. 6.

When NO at step #209, the program proceeds to step #213 to determine whether the input key is a basic key (touch panel TP1 in FIGS. 7 and 8).

When YES at step #213, a basic screen of a facsimile mode shown in FIG. 7 is displayed at step #215.

When NO at step #213, the program proceeds to step #217 where determination is made whether the input key is an application key (touch panel TP2 at FIGS. 7 and 8). When YES at step #217, the program proceeds to step #219 where an application screen of a facsimile mode of FIG. 8 is displayed to carry out the process of the facsimile application screen. The details thereof will be described afterwards.

When NO at step #217, miscellaneous process corresponding to a key input is carried out at step #231.

Figure 9:
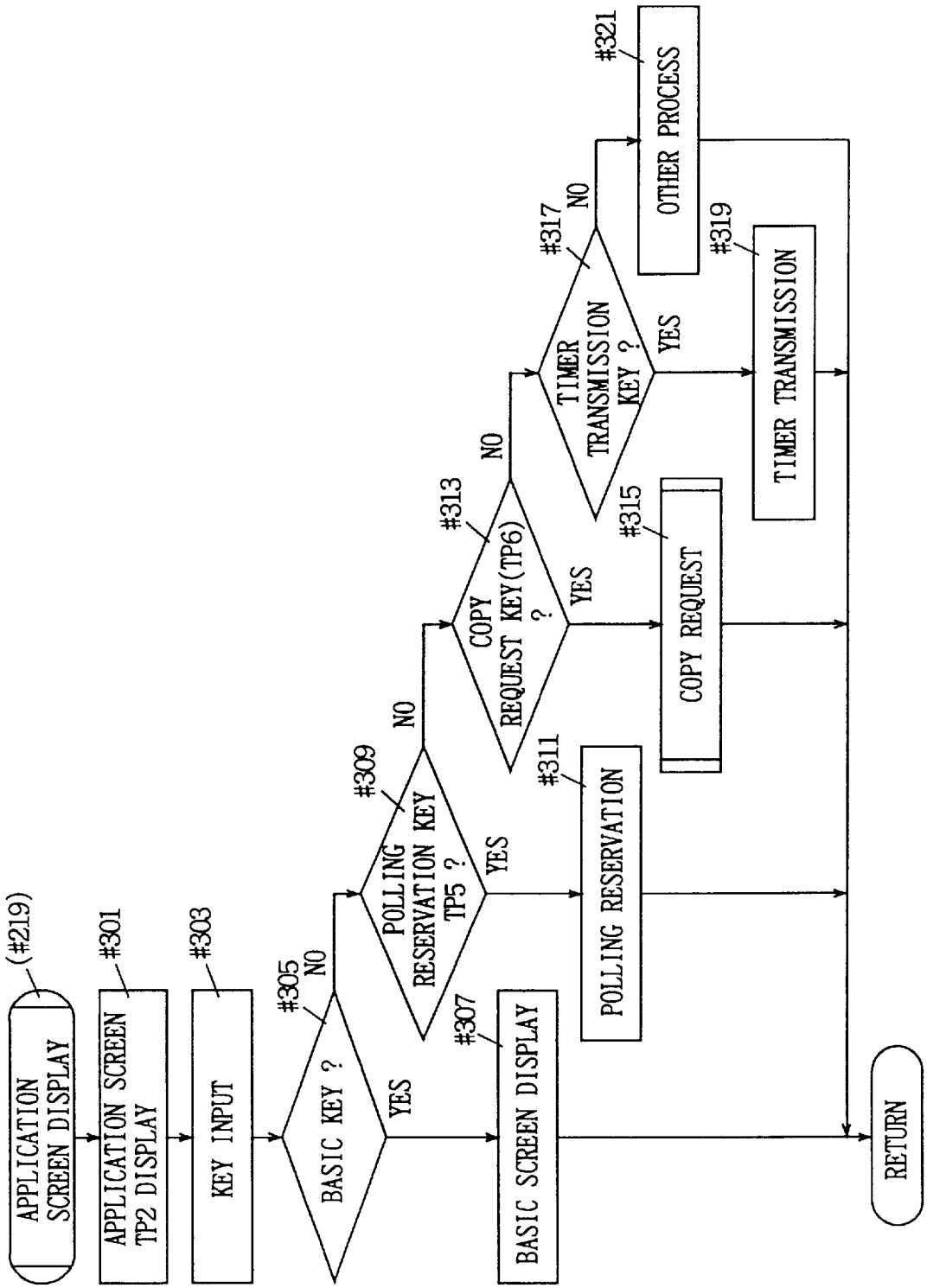
FIG. 9 is a flow chart showing specific contents of an application screen display routine (#219) of FIG. 6.

FIG. 9 is a flow chart showing the specific process of the application screen display routine (#219) of FIG. 6.

At step #301, a display is provided of the application screen of the facsimile mode shown in FIG. 8. At step #303, key input is carried out.

At step #305, determination is made whether the key input is a basic key (touch panel TP1). If YES at step #305, the program proceeds to step #307 to provide a display of the basic screen shown in FIG. 7.

When NO at step #305, determination is made whether the input key is a polling reservation key (touch panel TP5 of FIG. 8) at step #309.

When YES at step #309, the program proceeds to step #311 to provide a polling reservation request to control unit CPU 104.

Here "polling" is the function to transmit the original set in the facsimile apparatus of the transmission side by operation of the reception side, and "polling reservation" refers to setting the time for carrying out polling.

When NO at step #309, the program proceeds to step #313 to determine whether the input key is a copy request key (touch panel TP6 of FIG. 8).

When YES at step #313, the program proceeds to step #315 to carry out the copy request process. The copy request process will be described afterwards.

When NO at step #313, the program proceeds to step #317 to determine whether the input key is a timer transmission key (touch panel) TP7 in FIG. 8.

When YES at step #317, the program proceeds to step #319 to carry out the timer transmission process.

Timer transmission process is the process of setting an original at the facsimile apparatus or storing contents of an original in a memory in the facsimile apparatus to automatically dial a specified destination party at a specified time for facsimile transmission. This timer transmission is employed in transmission to a foreign country that has difference in time and to carry out transmission late at night when the transmission cost is low in an operator-less manner.

When NO at step #317, the program proceeds to step #321 to carry out miscellaneous process corresponding to a key input.

Figure 10:
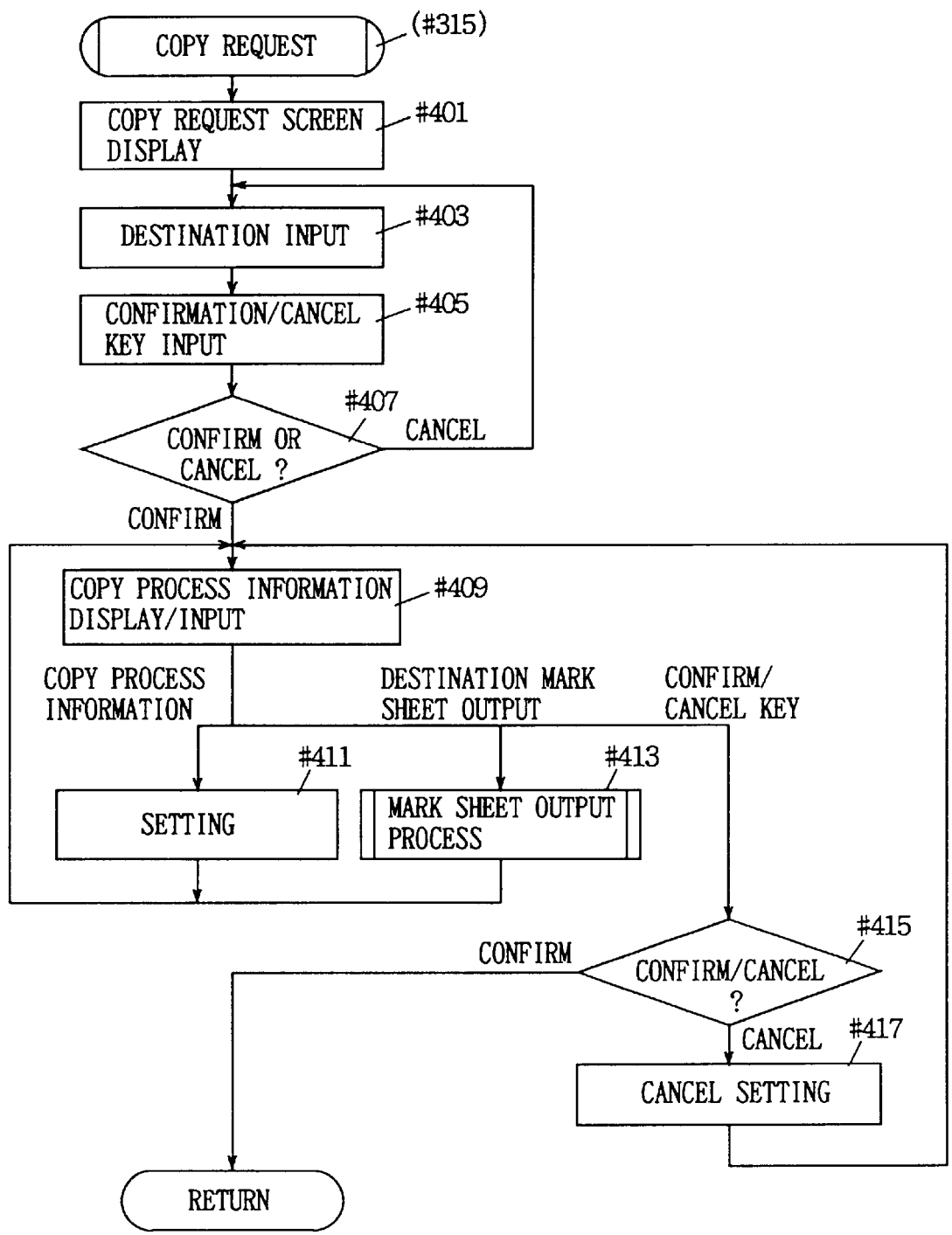
FIG. 10 is a flow chart showing specific contents of a copy request routine (#315) of FIG. 9.

FIG. 10 is a flow chart showing the specific contents of the copy request routine (#315) of FIG. 9.

Figure 11:
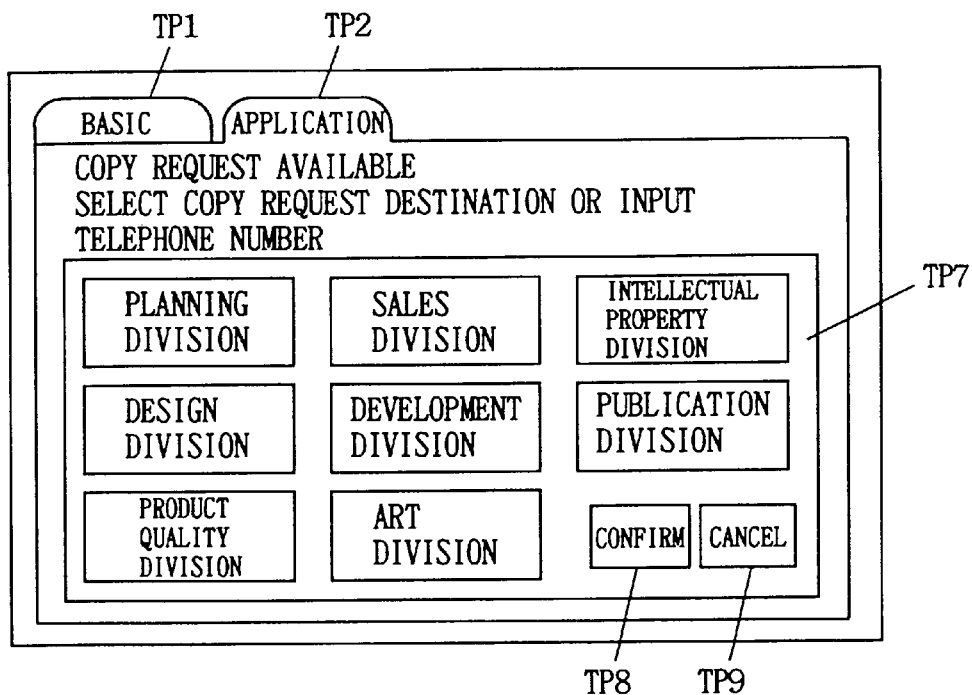
FIG. 11 shows a copy request screen displayed in a copy request screen display process (#401) of FIG. 10.

At step #401, display is provided of a copy request screen (FIG. 11).

At step #403, the user enters the party to carry out the copy request.

This destination party input is carried out using touch panel TP7 or the ten key to enter a facsimile number.

At step #405, input of a confirmation key (touch panel TP8) or a cancel key (touch panel TP9) is carried out.

At step #407, determination is made whether the input key is a confirmation key or a cancel key. When determination is made that the cancel key is input at step #407, the process from step #403 is repeated.

Figure 12:
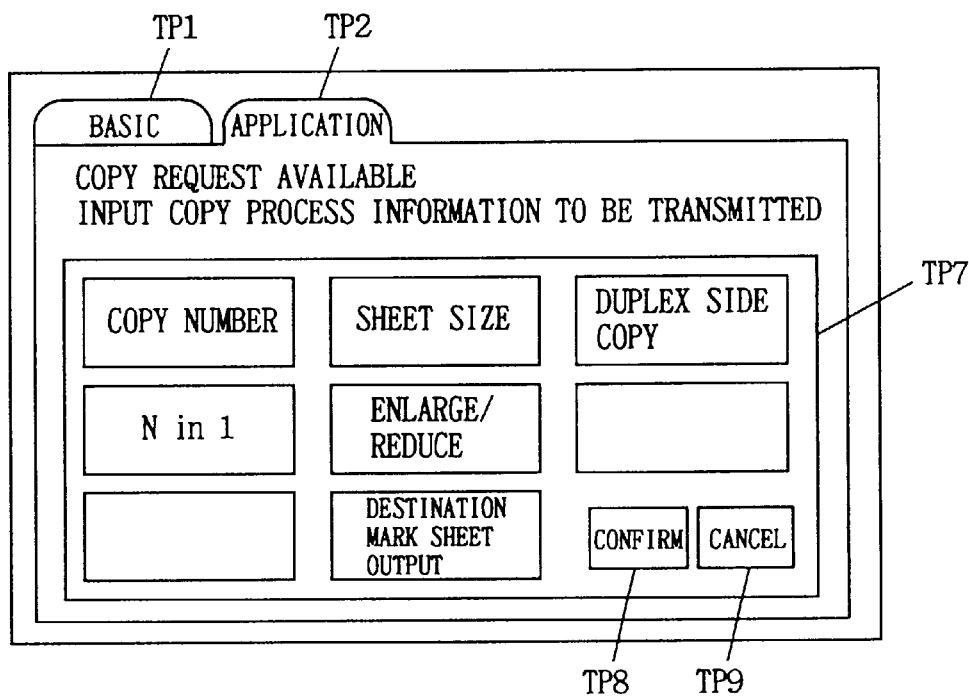
FIG. 12 shows a copy process information input screen displayed at a copy process information display routine (#409) of FIG. 10.

When determination is made that a confirmation key is depressed at step #407, the program proceeds to step #409 to provide a display of a copy process information input screen (FIG. 12) on the touch panel to wait for user input.

Input includes input of copy process information, input of a destination mark sheet output request, or input of confirmation/cancel key.

Input of copy process information indicates input of information of an image process applied on the transmitted image data at the facsimile apparatus of the receiving side. More specifically, input of the processes of "copy number specification", "sheet size specification", "duplex copy specification", "N in 1 (composite printing)" and "magnification/reduction" as shown in touch panel TP7 of FIG. 12. The user can select information of the image process to be carried out at the facsimile apparatus of the receiving side via touch panel TP7, and input a numeral such as the number of copies via the ten key. The input copy process information is set at step #411.

When the item of "destination mark sheet output" is selected via touch panel TP7, a mark sheet is output with the image processing function (copy processing function) of the destination party to carry out the copy request marked. Details of the mark sheet output process will be described afterwards.

When determination is made that either a confirmation key (touch panel TP8) or a cancel key (touch panel TP9) is depressed, branching is effected at step #415 according to the confirmation key or cancel key.

When determination is made that a cancel key is input at step #415, the program proceeds to step #417 to clear the setting of the copy process information. Then, the process from step #409 is carried out again.

When determination is made that the confirmation key is depressed at step #415, the process is terminated.

Figure 13:
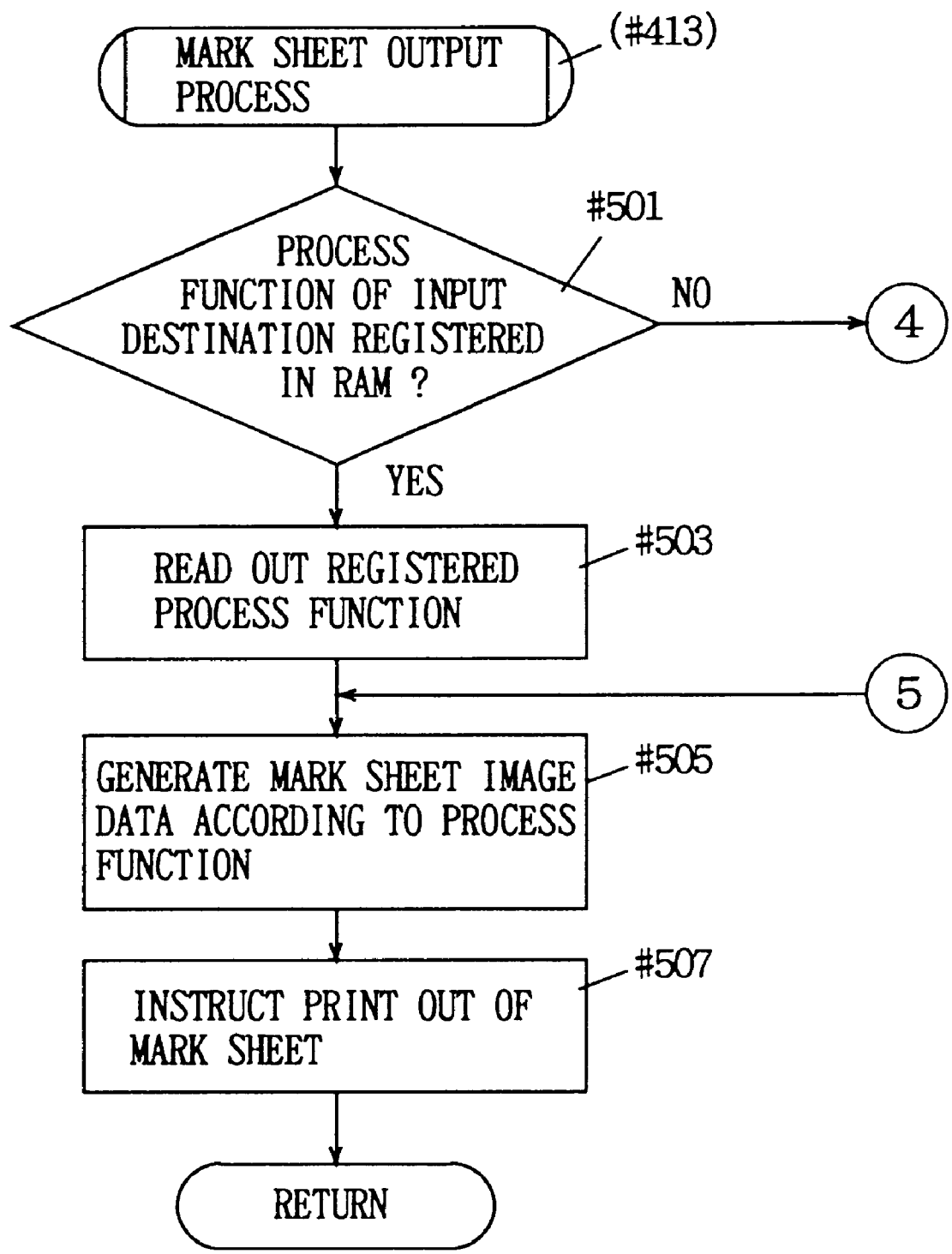
FIGS. 13 and 14 are flow charts showing specific contents of a mark sheet output process (#413) of FIG. 10.
Figure 14:
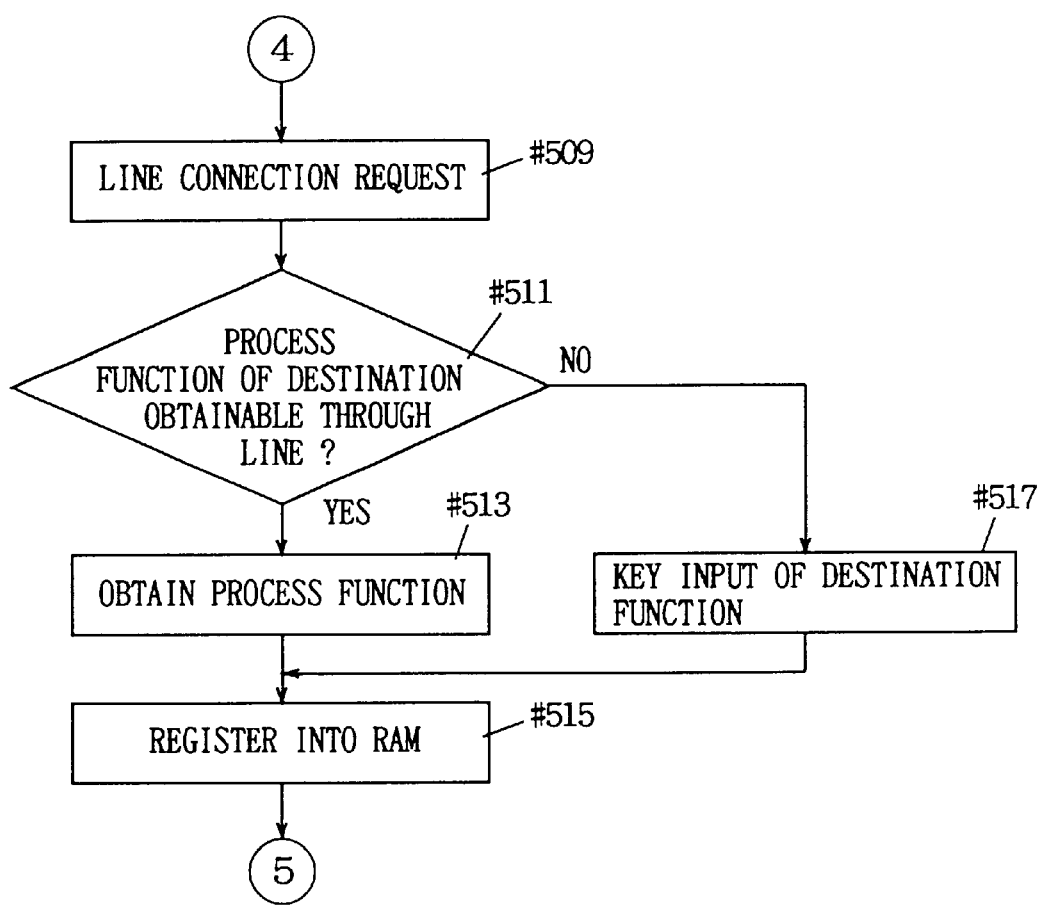

FIGS. 13 and 14 are flow charts showing specific contents of the mark sheet output process (#413) of FIG. 10.

At step #501, determination is made whether the copy process function of the facsimile apparatus of the input destination party in the above-described destination input process (#403 in FIG. 10) is stored in the RAM.

When YES at step #501, the program proceeds to step #503 to read out the process function of the destination party registered in the RAM.

At step #505, a corresponding mark sheet image data according to the read out copy process function is generated.

At step #507, the generated mark sheet image data is printed via printer device PRT.

When NO at step #501, the program proceeds to step #509 to provide a request for connecting the line to the facsimile apparatus of the destination side.

At step #511, determination is made whether the copy process function of the facsimile apparatus of the destination side can be obtained via the line.

When YES at step #511, the program proceeds to step #513 to obtain the process function of the destination facsimile apparatus through the line by polling.

At step #515, the obtained process function is registered in the RAM. Then, the process from step #505 is carried out.

When NO at step #511, the program proceeds to step #517 where the copy process function of the destination party is input via the touch panel or the ten key. Then, the process from step #515 is carried out.

The copy process function of the facsimile apparatus of the destination party registered in the RAM will be described hereinafter.

Referring to FIG. 15, a plurality of facsimile numbers are stored in the RAM. The absence/presence of respective functions of copy process items 1–9 and 0 for each of the apparatuses of the facsimile numbers is recorded in the RAM. Here, o indicates that the relevant facsimile apparatus has the relevant copy processing function, and × indicates that the relevant facsimile apparatus lacks the relevant copy process function in FIG. 15.

More specifically, as to the facsimile apparatus with the facsimile number of "06-123-4567" in FIG. 15, the functions of copy process items 1, 2, 3 and 5 are incorporated, and the functions of the copy processing items of 4, 6–9 and 0 are not incorporated in that facsimile apparatus. Similarly, the facsimile apparatus with the facsimile number of "06-234-5678" includes the copy process functions of items 2, 3 and 5, and lacks the functions of copy process items 1, 4, 6–9 and 0. In a mark sheet output process, mark sheet image data is produced according to the facsimile numbers stored in the RAM and corresponding copy process items.

Figure 16:
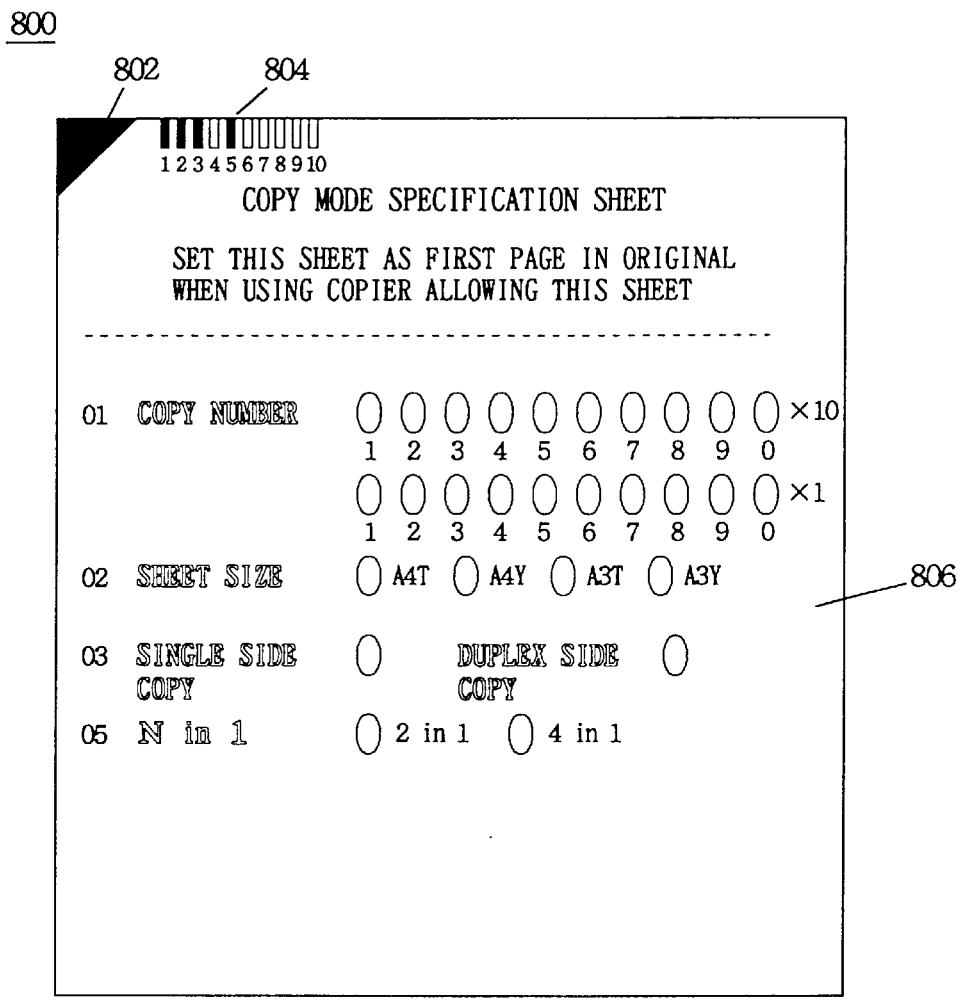
FIG. 16 shows a specific example of a mark sheet used in a copy request.

When the facsimile apparatus with the facsimile number of "06-123-4567" shown in FIG. 15 is set as the destination facsimile apparatus for the copy request, the mark sheet shown in FIG. 16 is output via printer device PRT.

A mark sheet 800 includes a mark sheet identification mark 802, an item number code 804 for indicating the function items in the mark sheet, and a mark sheet entry column 806 for setting a copy mode. Item number code 804 is constituted by the items of 1–9 and 0. The copy process item incorporated in the relevant facsimile apparatus (the copy process item number marked with o in FIG. 15) out of the copy process items of the facsimile apparatus is shown as a solid rectangle.

Mark sheet entry column 806 includes the columns corresponding to the copy process items of that facsimile apparatus. For the facsimile apparatus with the facsimile number of "06-123-4567", for example in FIG. 15, entry columns for the copy number, sheet size, duplex copy, and composite printing process corresponding to copy process items 1–3 and 5 are provided in mark sheet entry column 806.

Figure 17:
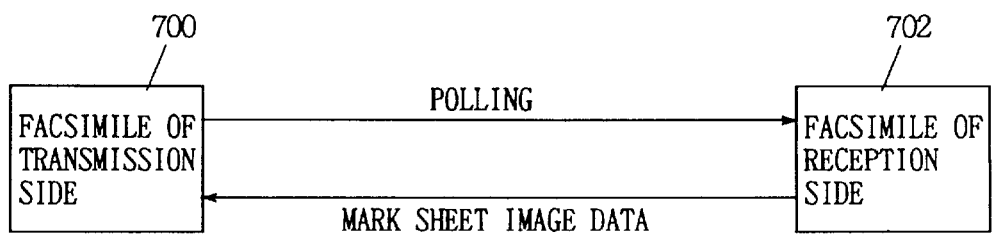
FIG. 17 shows a procedure for obtaining mark sheet image data according to polling by a facsimile apparatus of the receiving side.

Although a mark sheet is generated and output within a facsimile apparatus according to the facsimile function of the destination party registered in the RAM of the facsimile apparatus in the above-described flow chart, the mark sheet image data of the facsimile apparatus of the destination party can be obtained via facsimile from the destination party by polling as shown in FIG. 17.

More specifically, referring to FIG. 17, a request for transmitting mark sheet image data is provided to a receiving-side facsimile apparatus 702 from a sending-side facsimile apparatus 700 by polling. In response to the request, receiving-side facsimile apparatus 702 sends mark sheet image data according to the function thereof to transmitting-side facsimile apparatus 700.

An operator at the facsimile apparatus of the sender side can easily obtain a mark sheet according to the function of the facsimile apparatus of the destination side.

(2) Control unit CPU 104

Figure 18:
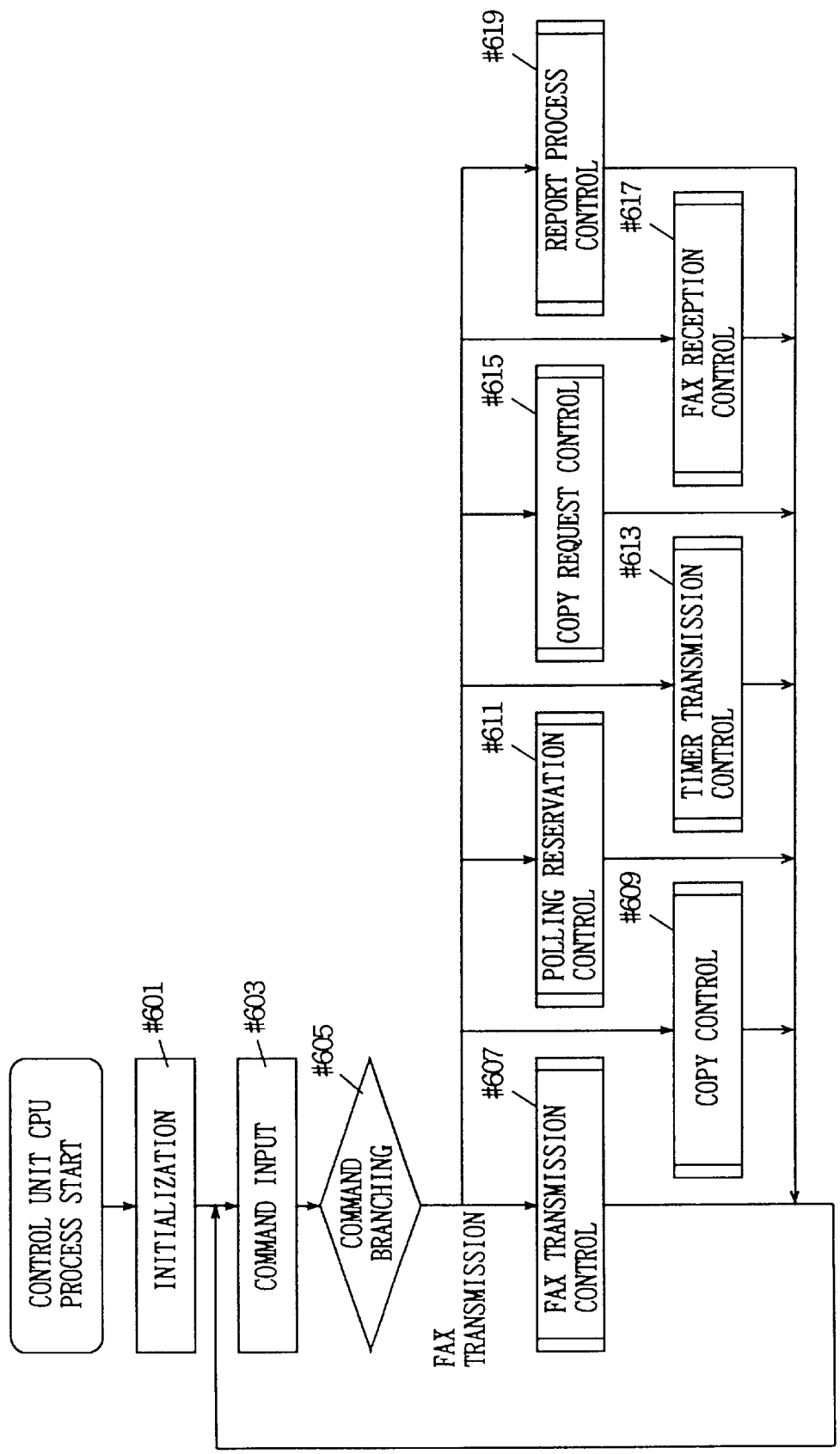
FIG. 18 is a flow chart showing the process carried out by the control unit CPU.

The process carried out by control unit CPU 104 is shown in the flow chart of FIG. 18.

When power is turned on, control unit CPU 104 carries out initialization according to a program stored in ROM 114 at step #601.

At step #603, control unit CPU 104 waits for a command to be input from another CPU. When a command is input at step #603, the program proceeds to step #605 to determine the contents of the input command. A process corresponding to the input command is executed.

More specifically, a process corresponding to various commands of facsimile transmission control, copy control, polling reservation control, timer transmission control, copy request control, facsimile reception control and report process control output from an operation panel unit CPU 101 is carried out at respective steps #607–#619.

The process of each of steps #607–619 will be described hereinafter.

(a) Copy request control (#615)

Figure 19:
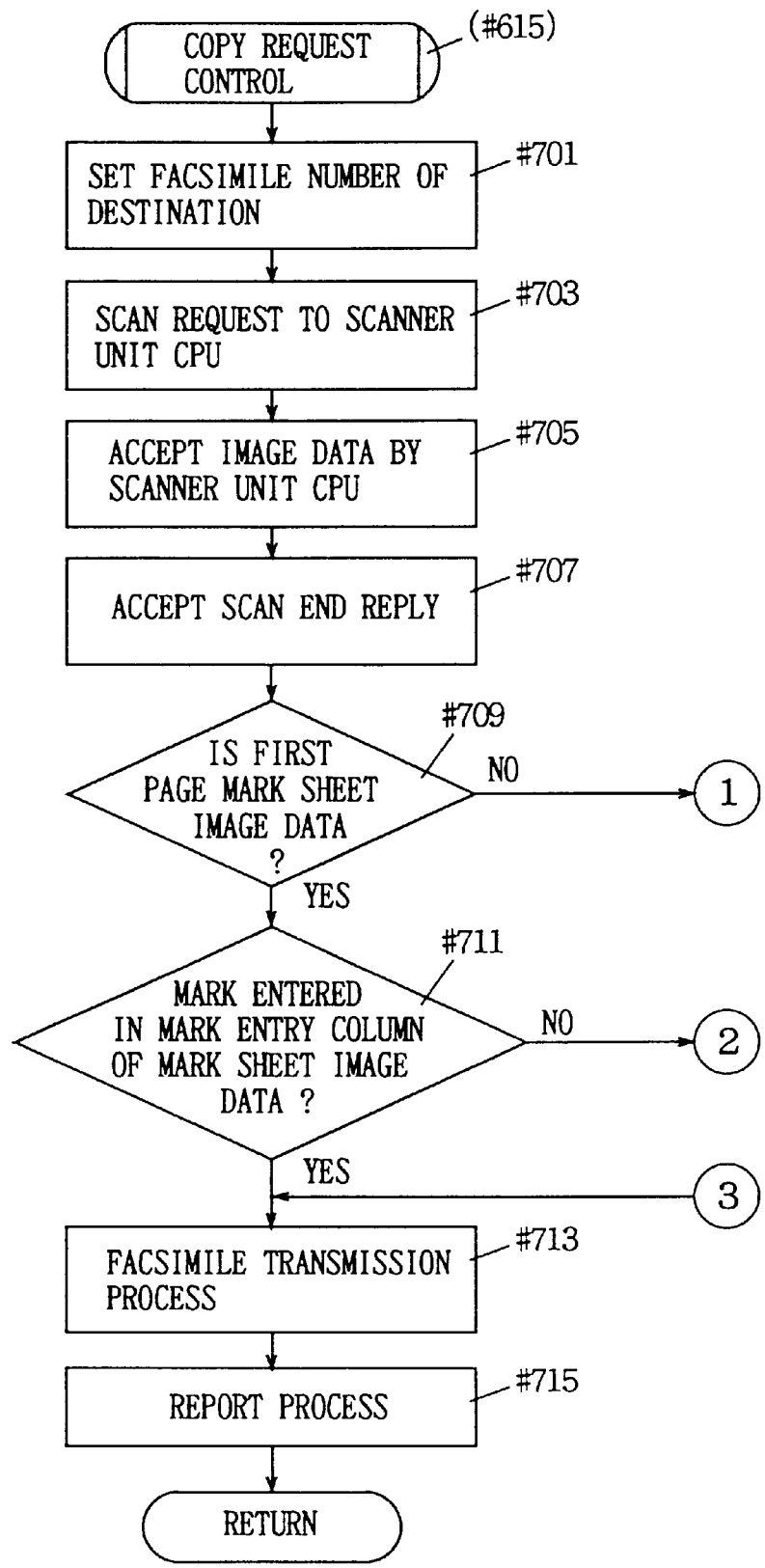
FIGS. 19–21 are flow charts showing specific contents of copy request control (#615) of FIG. 18.
Figure 20:
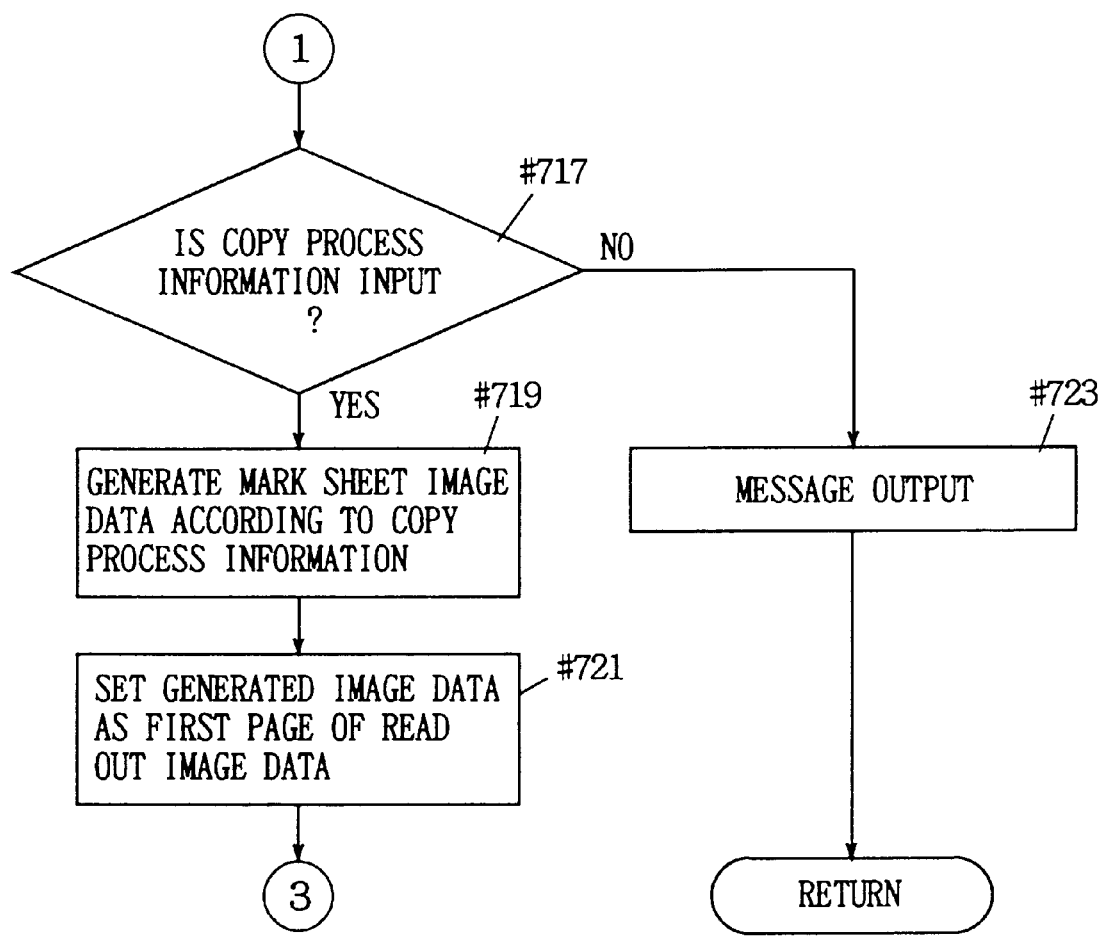
Figure 21:
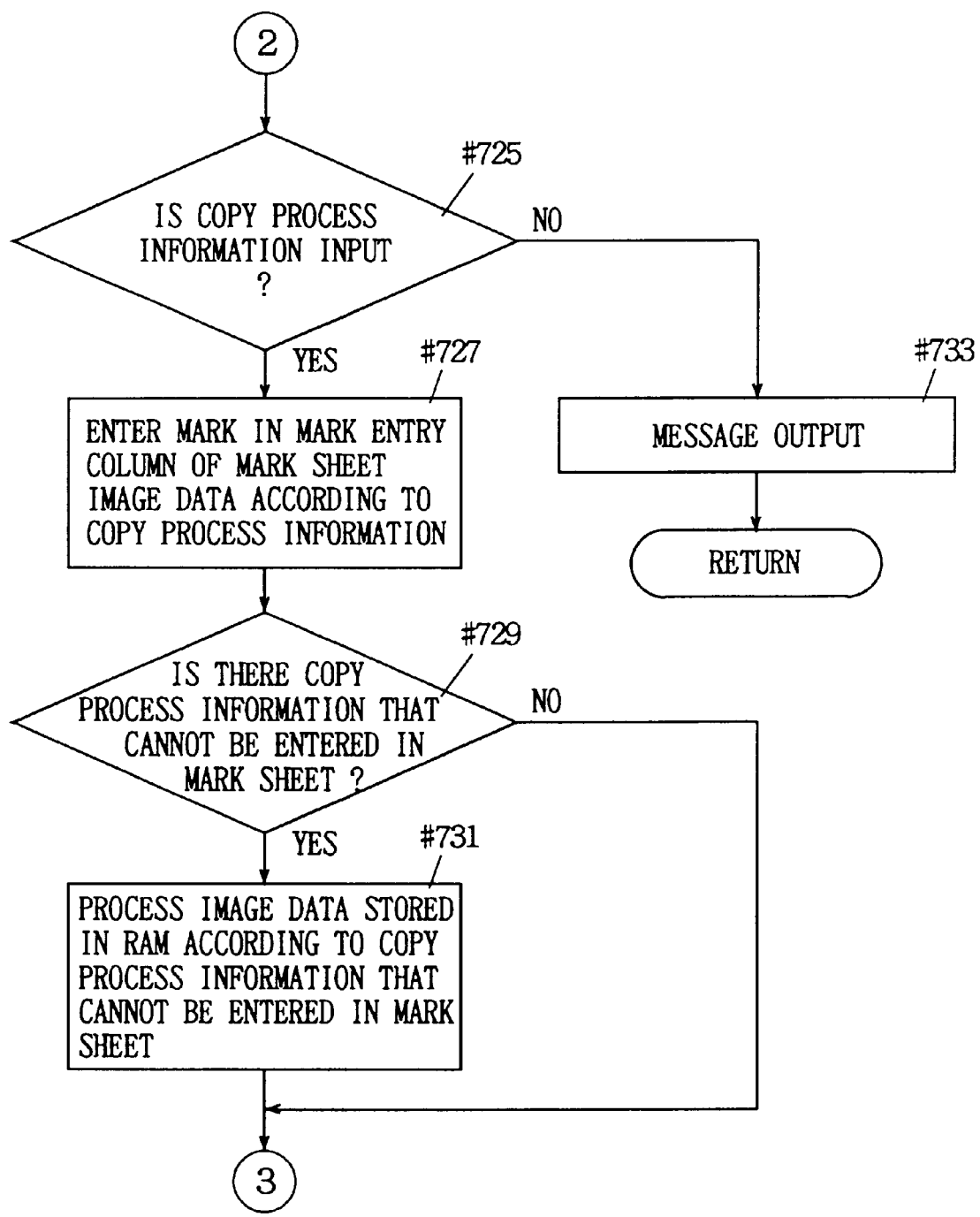

Referring to the flow charts of FIG. 19–21 showing the specific contents of copy request control of step #615, the facsimile number of the destination party that carries out the copy request entered through the process of operation panel unit CPU 101 is set at step #701. This facsimile number of the destination party is the number input by a user at step #403 of FIG. 10.

At step #703, a scan request is provided to scanner unit CPU 102 for reading out the original image set at the reader device by the user. Scanner unit CPU 102 reads the original image according to this scan request.

At step #705, control unit CPU 104 accepts the original image data read out by the scanner unit.

At step #707, control unit CPU 104 accepts a scan end reply from scanner unit CPU 102. Thus, the readout operation of an original image ends.

At step #709, determination is made whether the head page of the read out original image data is mark sheet image data. This determination is carried out by detecting whether mark sheet identification sign 802 is marked at the left shoulder portion of the mark sheet.

When YES at step #709, the program proceeds to step #711 to detect whether the mark sheet entry column (code 806 of FIG. 16) of that mark sheet image data is marked or not.

When YES at step #711, the program proceeds to step #713 to carry out a facsimile transmission process with mark sheet image data as the beginning page.

At step #715, a report process is carried out to provide a report indicating that facsimile transmission has ended. More specifically, this report process is carried out by providing a report output request from control unit CPU 104 to print unit CPU 103.

When NO at step #709, the program proceeds to step #717 to determine whether copy process information is input from operation panel OP. This input is specifically the input carried out at steps #409 and #411 of FIG. 10.

Figure 24:
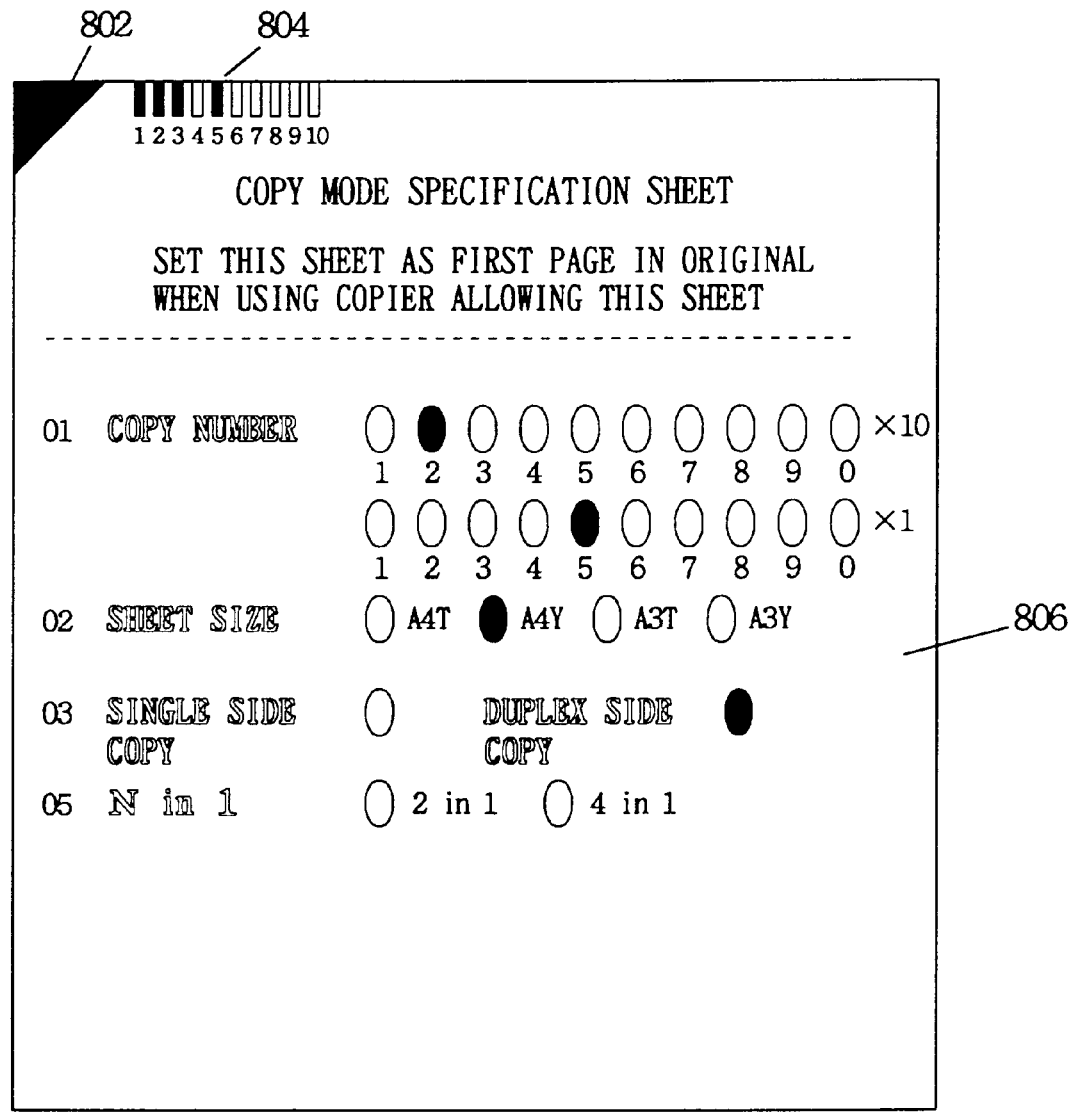
FIG. 24 shows a specific example of a mark sheet that is marked.

When YES at step #717, the program proceeds to step #719 to generate mark sheet image data in RAM 124 according to the input copy process information of the facsimile apparatus. The image data is the image data marked with respective process items as shown in FIG. 24.

At step #721, the generated mark sheet image data is set as the first page of the original image data obtained by read out.

Following the process of step #721, the facsimile transmission process from step #713 is carried out.

When NO at step #717, a message is provided on the touch panel to prompt input of the copy process information of the copy request through operation panel OP or a mark sheet at step #723. Here, this process ends.

When NO at step #711, the program proceeds to step #725 to determine whether copy process information is input or not.

When YES at step #725, the relevant item in the mark entry column of the mark sheet image obtained by read out is marked according to the input copy process information.

Figure 23:
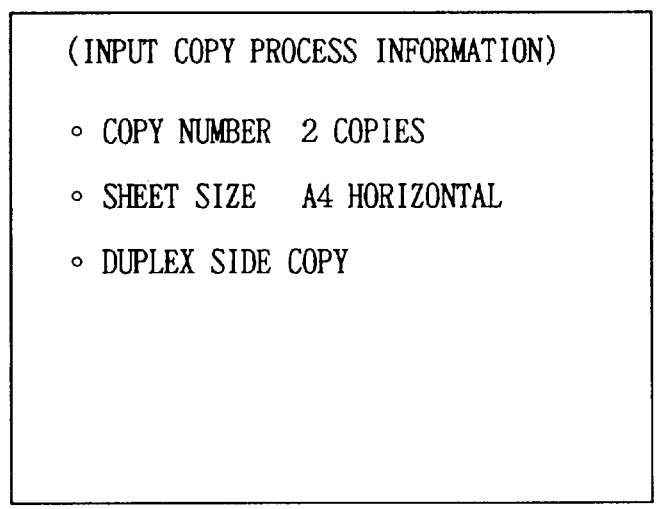
FIG. 23 shows a specific example of copy process information.
Figure 25:
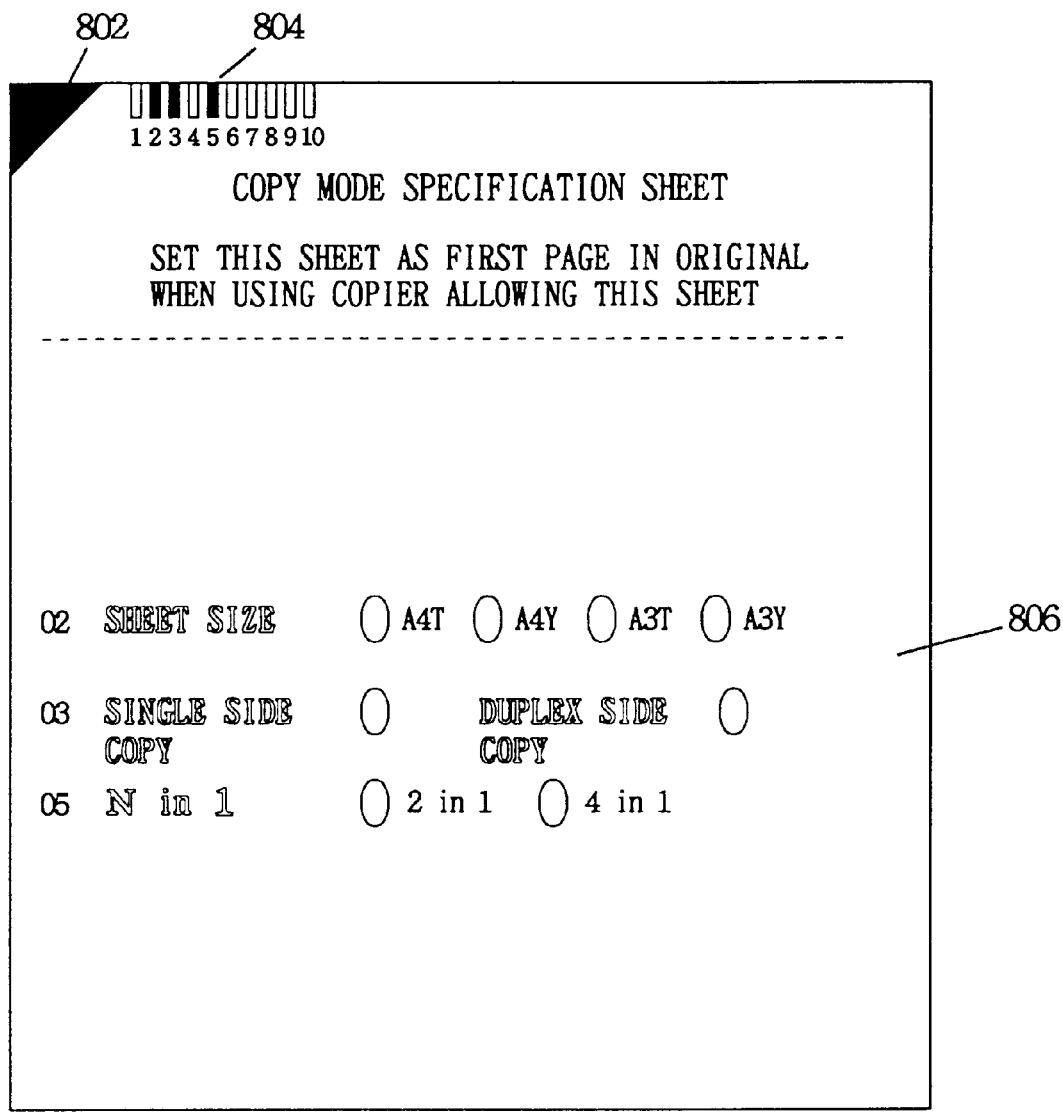
FIG. 25 shows a specific example of a mark sheet that is read out.

At step #729, determination is made whether copy process information that cannot be entered in the mark sheet is input. This detection is made depending whether the item of the input copy process information corresponds to an item in item number code 804 of the mark sheet image data. For example, when the copy process information input via operation panel OP includes the information of "copy number", "sheet side" and "duplex copy" as shown in FIG. 23, and when the mark sheet entered as image data lacks the item of "copy number" as shown in FIG. 25, determination is made that there is copy process information that cannot be entered in the mark sheet at step #729 (YES).

When YES at step #729, the program proceeds to step #731 to process the original image data obtained by read out in the RAM according to the copy process information that cannot be entered into the mark sheet. More specifically, when mark sheet image data as shown in FIG. 25 is entered with respect to the copy process information shown in FIG. 23, image data duplication is carried out for the original image data stored in the RAM. More specifically, four original image data of ¼~¼ input with the mark sheet of FIG. 25 as the head page as shown in FIG. 27(*a*) is stored in the RAM in a state where only original image data is duplicated with the mark sheet of FIG. 26 as shown in FIG. 27(*b*).

Following the process of step #731, a facsimile transmission process is carried out at step #713.

When NO at step #725, a message prompting input of copy process information likewise #723 is provided. This process ends here.

Figure 22:
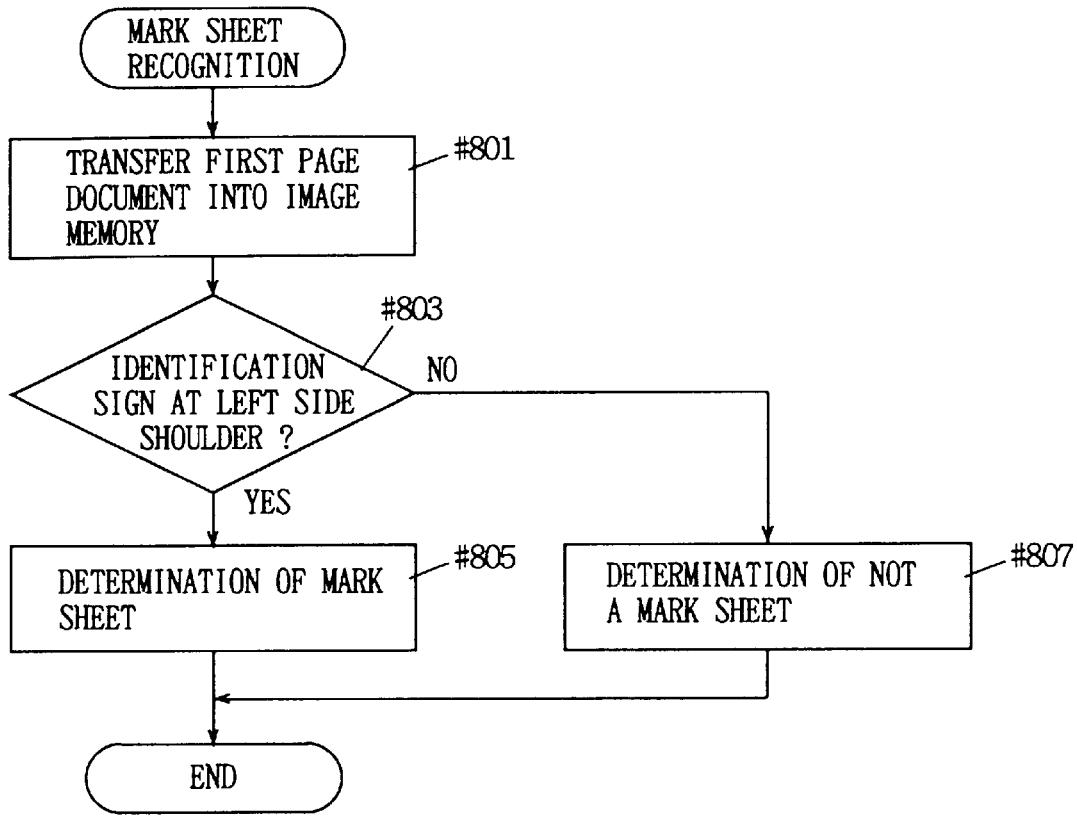
FIG. 22 is a flow chart showing the process for identifying whether the image is a mark sheet image or not.

FIG. 22 is a flow chart showing the process for identifying mark sheet image data carried out at step #709 of FIG. 19.

At step #801 in FIG. 22, the first page of the original image data read out is transferred to the image memory (RAM).

At step #803, determination is made whether there is a mark sheet identification sign 802 at the left side shoulder portion of the transferred image data. When there is a mark sheet identification sign 802, the program proceeds to #805 to determine that the original image data thereof is mark sheet data. When there is no mark sheet identification signal 802, the program proceeds to step #807 to determine that the original image data thereof is not mark sheet data.

The advantage of the copy request control carried out by the facsimile apparatus of the present embodiment is set forth in the following.

Since a mark sheet indicating the copy process function incorporated by the facsimile apparatus of the receiving side can be obtained by the sender of the transmission side, a copy request according to the function of the facsimile apparatus of the receiving side can be carried out at the sender side. As to the items that cannot be processed by the facsimile apparatus of the receiving side out of the entered copy control information, image processing is carried out on the image data stored in the RAM of the facsimile apparatus of the transmitting side. Therefore, the image intended by the sender of the transmitting side can reliably be reproduced at the facsimile apparatus of the receiving side.

Transmission of copy process information in the form of mark sheet image data allows an image intended by the sender of the transmission side to be properly transmitted to the receiving side even when a facsimile apparatus that cannot process mark sheet image data receives such image data since the mark sheet image data will be output as information that is comprehensible visually by the receiver at the facsimile apparatus of the reception side.

(b) Facsimile reception control (#617)

Figure 28:
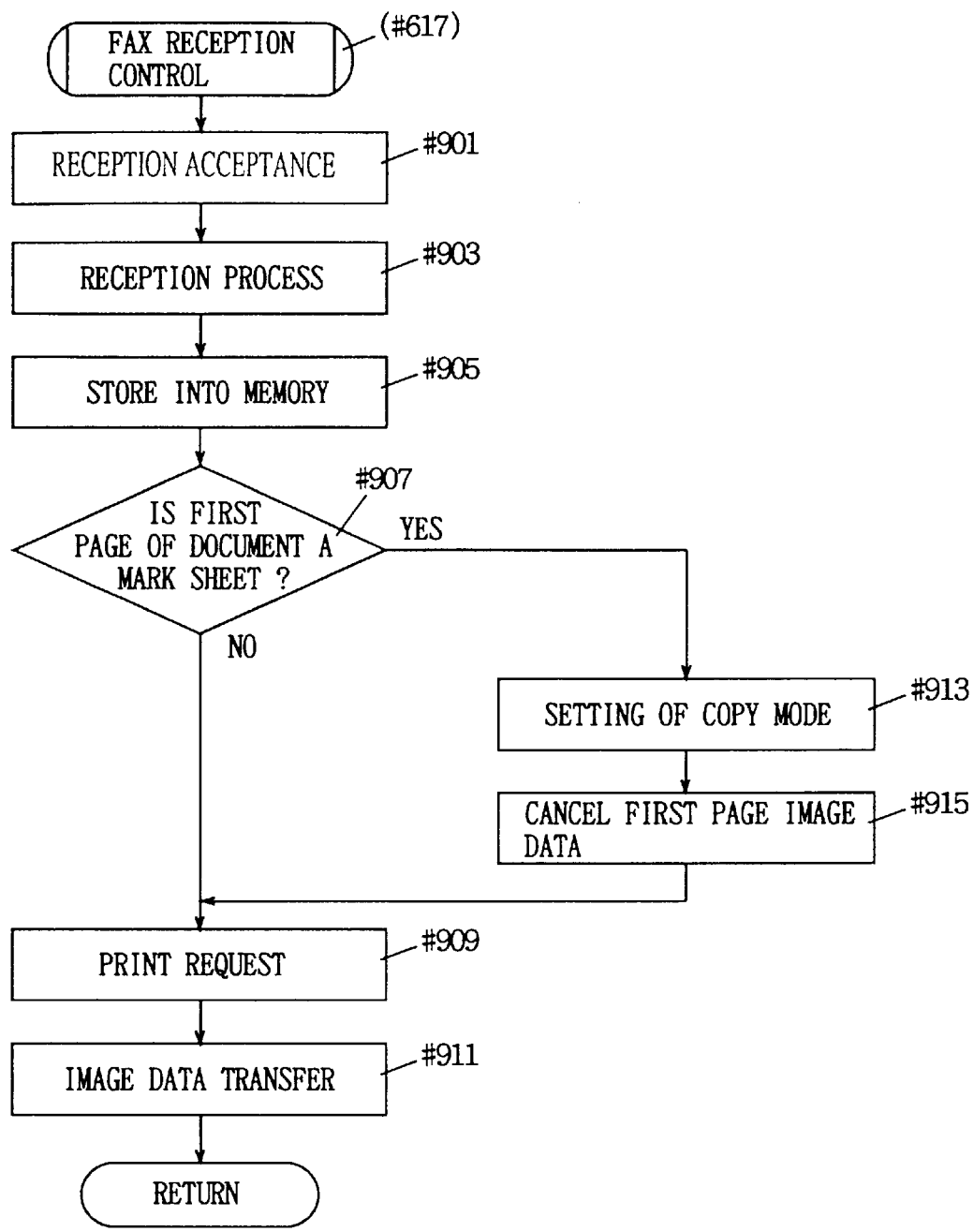
FIG. 28 is a flow chart showing specific contents of facsimile reception control (#617) of FIG. 18.

FIG. 28 is a flow chart showing the specific process carried out by the facsimile reception control routine.

At step #901 of FIG. 28, reception from a facsimile apparatus of the transmitting side is accepted.

At step #903, the facsimile apparatus receives image data transmitted through a telephone line via G3 unit 42.

At step #905, the received original image data is stored in RAM 124.

At step #907, determination is made whether the first page image of the stored image data is mark sheet image data or not. This determination is carried out by a process similar to that of the flow chart shown in FIG. 22.

When YES at step #907, the program proceeds to step #913 to determine the copy process information according to the item present in mark sheet entry column 806 of the first-page mark sheet image data of the original image data and the indicated mark, whereby the copy mode (copy number, sheet size and the like) is set according to the identified copy process information.

At step #915, the mark sheet image data which is the first page data of the received image data is deleted from the memory. This is because the mark sheet image data is no longer necessary after the copy mode is set.

At step #909, a print request of the received original image data is provided to print unit CPU 103 according to the set copy mode.

At step #911, the received original image data is transferred to print unit CPU 103. This process ends here.

When NO at step #907, the processes of steps #913 and #915 are not carried out. This is because a process similar to that of a normal facsimile transmission is to be carried out when the first page of the image data is not mark sheet image data.

According to the facsimile reception control process of FIG. 28, a copy process according to the contents entered in the mark sheet, if mark sheet image data is included in the received image data, is carried out at the facsimile apparatus of the receiving side.

Figure 29:
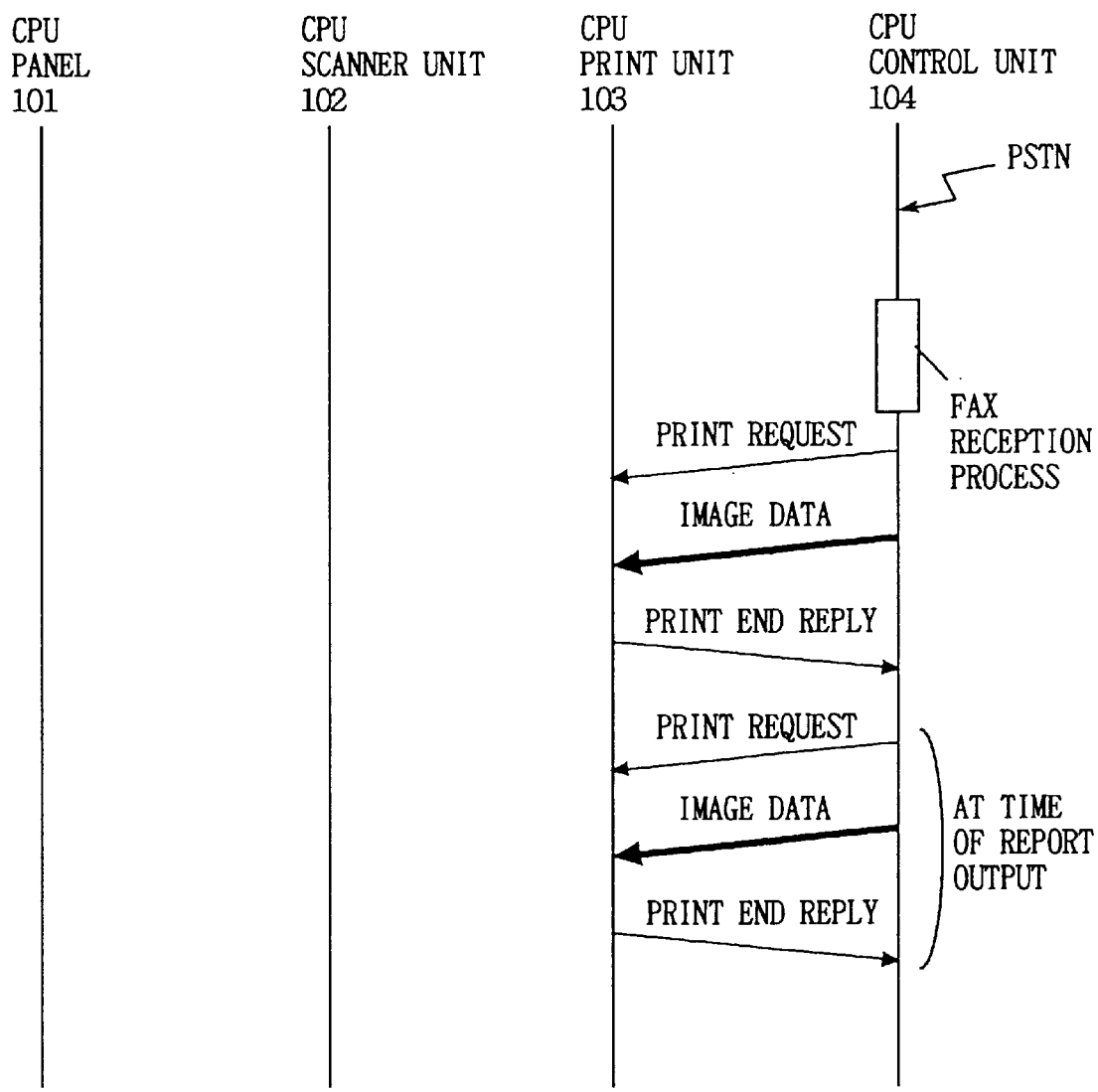
FIG. 29 is a diagram for describing the sequence carried out at facsimile reception control (#617) of FIG. 18.

Transmission of information between each CPU of FIG. 28 is carried out according to the sequence shown in FIG. 29.

Referring to FIG. 29, in response to input of a calling request from a caller transmission side into control unit CPU 104 via G3 unit 42, control unit CPU 104 connects the line.

Then, control unit CPU 104 sets the image reception mode such as the coding method, reception magnification, number of pixels per line of reception image, the number of pixels per line of input image, maximum number of allowed line error, and the like.

When code memory 126 is ready for reception, image data sent from the caller transmission side is demodulated by a modem in G3 unit 42. The demodulated image data is data-converted at facsimile conversion unit 41 and then stored in code memory 126.

At completion of image data reception, control unit CPU 104 disconnects the line, and provides a print request to print unit CPU 103.

Following a print request output, control unit CPU 104 carries out expansion of code data. The expansion-processed data is recorded in image memory 125. The recorded image data is read out and then provided to printer device PRT to be printed out.

At completion of printing, a print end reply is provided from print unit CPU 103 to control unit CPU 104. In response to this print end reply, control unit CPU 104 clears image memory 125, and the operation is completed.

A report output operation set forth in the following is carried out when a report is to be output after facsimile reception ends or when an error report is output due to an error during reception.

Control unit CPU 104 provides a print request to print unit CPU 103. Image data (image data of report) is provided from control unit CPU 104 to the print processing unit. In response, the print processing unit initiates printing.

When report printing ends, print unit CPU 103 provides a print end reply to control unit CPU 104. In response, print unit CPU 104 clears the memory. Thus, the operation is completed.

(c) Copy control (#609)

Figure 30:
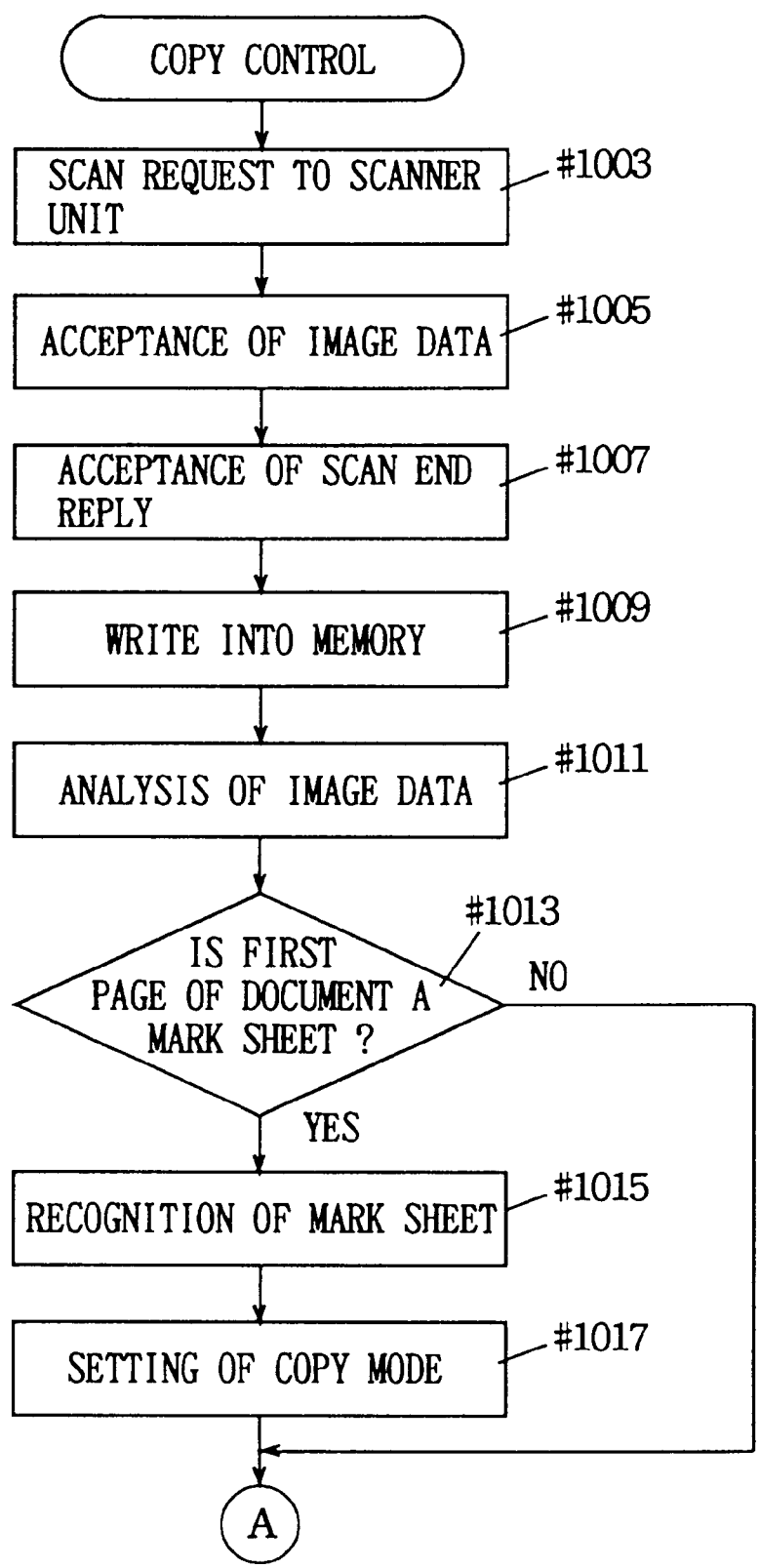
FIGS. 30 and 31 are flow charts showing specific processes carried out at a copy control routine (#609) of FIG. 18.

FIG. 30 is a flow chart showing the specific process of copy control (#609).

At step #1003 in FIG. 30, a scan request is provided to scanner unit CPU 102 to read out the set original. In response to a scan request, original reader device IR initiates read out of the original.

At step #1005, image data is input by scanner unit CPU 102. At step #1007, a scan end reply is provided from scanner unit CPU 102. At step #1009, the input image data is written into the memory.

At step #1011, the image data written into the memory is analyzed. At step #1013, determination is made whether the first page of the image data written into the memory is mark sheet data. This process is carried out according to the described flow chart of FIG. 22.

When YES at step #1013, the program proceeds to step #1015 to identify the item in the mark sheet entry column and the mark in the read out mark sheet. At step #1017, the copy mode is set.

At step #1019, a print request is provided to print unit CPU 103.

At step #1021, original image data read out by the scanner unit is transferred to print unit CPU 103 in response to the print request.

At step #1023, a print end reply is accepted from print unit CPU 103. The present process ends here.

The copy process carried out in a copy mode of a facsimile apparatus of the present embodiment is effected according to the contents in the mark sheet, if any, at the beginning of the set original. The user can set information such as the number of copies and magnification via the mark sheet. Thus, usability of the facsimile apparatus is improved.

(d) Facsimile Transmission Control (#607).

Figure 32:
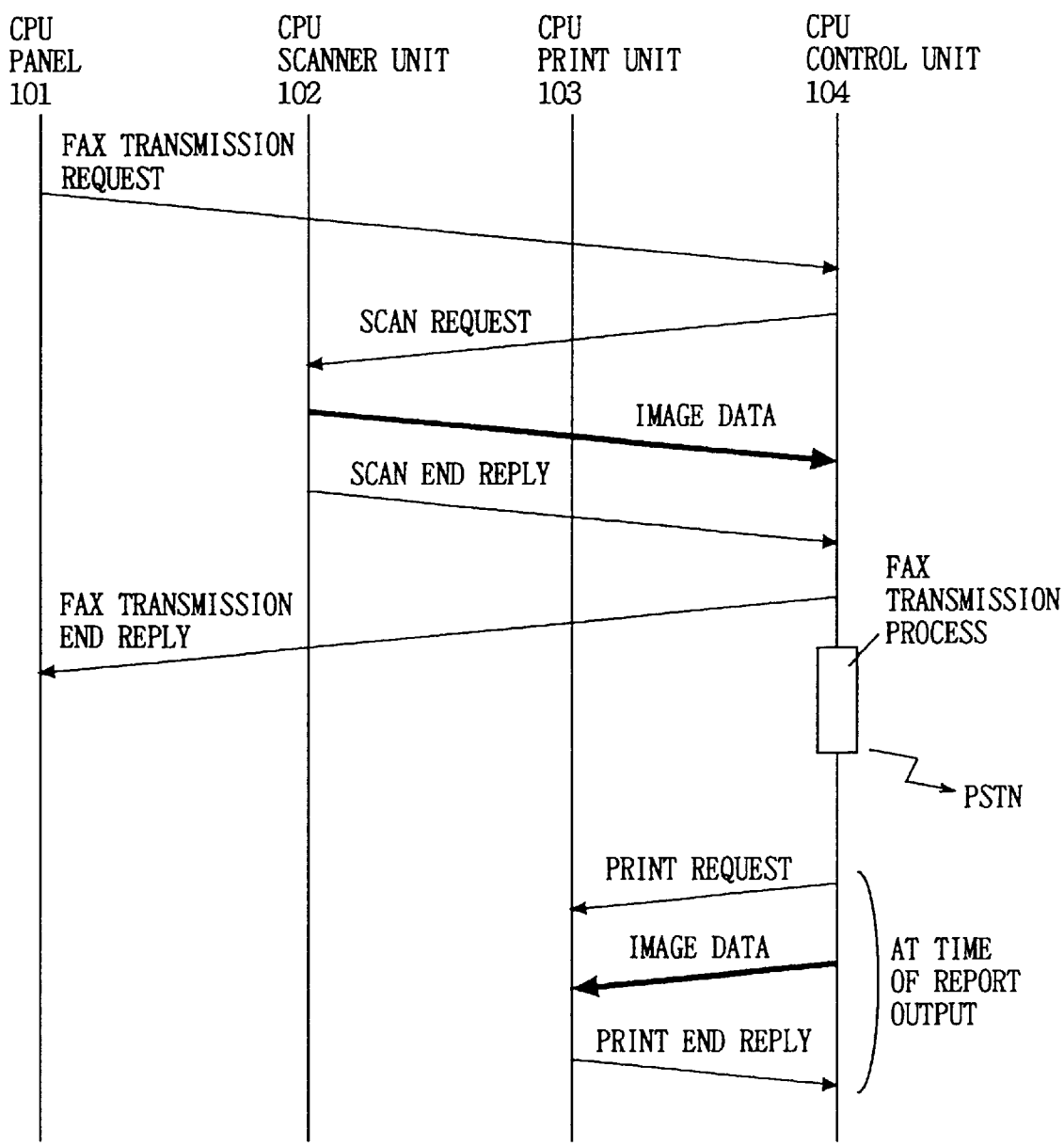
FIG. 32 is a diagram for describing the sequence carried out in facsimile transmission control (#607) of FIG. 18.

FIG. 32 is a timing chart for describing the operation sequence of each CPU in facsimile transmission control.

Referring to FIG. 32, depression of start key 96 by a user causes the operation sequence in the transmission mode to be initiated. A facsimile transmission request is provided from operation panel unit CPU 101 that controls the operation panel unit to control unit CPU 104. Control unit CPU 104 provides a scan request to scanner unit CPU 102 in response to this transmission request.

Scanner unit CPU 102 initiates scanning of the original in response to a scan request. When the scanner arrives at an image region of the original, image processing is carried out according to a preset image processing mode. The processed image data is provided to control unit CPU 104 and input into memory unit 30. Then, the image data is stored in image memory 125.

Control unit CPU 104 applies a compression process on the image data stored in image memory 125. The compressed image data is stored in code memory 126 as code data.

When readout of an original image by scanning ends, a scan end reply is provided from scanner unit CPU 102 to control unit CPU 104. In response, control unit CPU 104 provides a facsimile transmission end reply to operation panel unit CPU 101.

When the compression process of the image data ends and all the image (code) data to be transmitted is stored in code memory 126, control unit CPU 104 controls G3 unit 42 to connect the line. The receiver facsimile apparatus of the calling destination (facsimile apparatus of the receiving side) is called, whereby the line is connected. Confirmation of line connection is obtained by receiving a line connection response from the facsimile apparatus of the receiving side.

Next, control unit CPU 104 reads out the code data stored in code memory 126. The read out code data is provided to facsimile conversion unit 41 to be image data-converted. The converted image data is modulated by a modem in G3 unit 42. The modulated image data is transmitted to the receiver side via a telephone line (PSTN).

When image data transmission ends, control unit CPU 104 provides a line disconnect request to the receiver side. In response, a line disconnection process is carried out.

Following the line disconnection process, the contents of code memory 126 are cleared. The facsimile transmission process ends.

When a report output mode for providing a transmission report after facsimile transmission ends is set or when an error report is output due to an error during transmission, the following process is carried out. More specifically, control unit CPU 104 provides a print request to print unit CPU 103. Then, image data (here, image data report) is provided from control unit CPU 104 to print unit CPU 103. As a result, print out of a report is initiated at the print processing unit.

When report printing ends, a print end reply is provided from print unit CPU 103 to control unit CPU 104. In response, control unit CPU 104 clears the memory. The facsimile transmission process ends.

(e) Others

In polling reservation control (#611) and timer transmission control (#613), the above-described polling reservation control and timer transmission control are carried out.

(3) Scanner unit CPU 102

Figure 33:
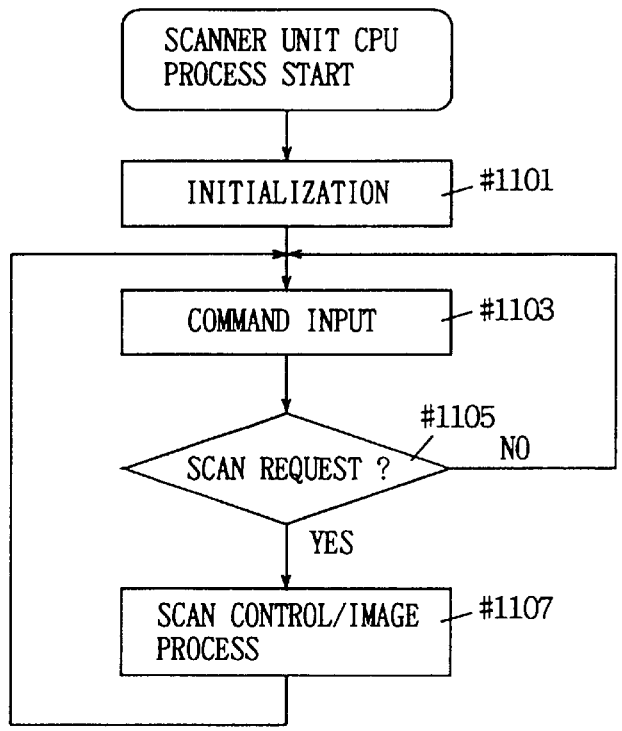
FIG. 33 is a flow chart showing the process carried out by the scanner unit CPU.

FIG. 33 is a flow chart showing the process carried out by scanner unit CPU 102. When the power is turned on, initialization is carried out at the scanner unit according to a program registered in ROM 112 at step #1101.

At step #1103, scanner unit CPU 102 waits for a command to be input from control unit CPU 104 and the like.

When a command is input at step #1103, the program proceeds to step #1105 to determine whether the input command is a scan request command. If a scan request command is input, the program proceeds to step #1107. Here, scan control and image processing of image data obtained by scanning are carried out.

When NO at step #1105, or when the process of step #1107 ends, the process from step #1103 is carried out.

In step #1107, scanning and image processing is carried out in an image readout mode of the resolution and times sent together with the scan request from control unit CPU 104. The scan image data is provided to control unit CPU 104.

(4) Print Unit CPU 103

Figure 34:
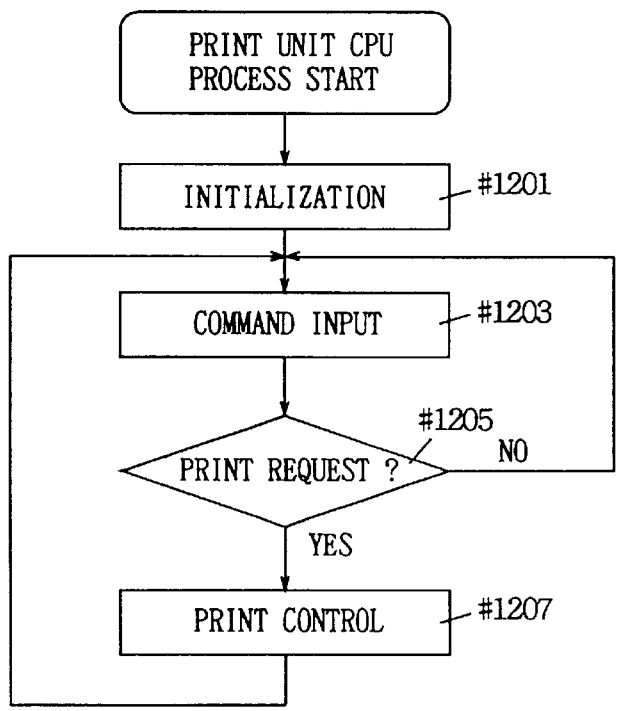
FIG. 34 is a flow chart showing the process carried out by the print unit CPU.

The process carried out by print unit CPU 103 is shown in the flow chart of FIG. 34.

When power is turned on, initialization is carried out in print unit CPU 103 according to a program registered in ROM 113 at step #1201.

At step #1203, print unit CPU 103 waits for a command to be input from control unit CPU 104. When a command is input, the program proceeds to step #1205 to determine whether the input command is a print request command.

When YES at step #1205, the program proceeds to step #1207 for print control.

In step #1207, a print process is carried out in a print mode of the resolution and tone sent from control unit CPU 104 together with a print request. Then, the image data is provided to a printer device PRT to be printed out.

When NO at step #1205, or when the process of step #1207 ends, the process from step #1203 is repeated.

SECOND EMBODIMENT

The structure of the facsimile apparatus according to a second embodiment of the present invention is substantially similar to that of the facsimile apparatus of the first embodiment. Therefore, the description thereof will not be repeated.

The facsimile apparatus of the second embodiment differs from the facsimile apparatus of the first embodiment in that, when a mark sheet is read out as image data together with an original following input of copy process information through operation panel OP and there is copy process information that cannot be entered in the read out mark sheet, that copy process information is transmitted to the facsimile apparatus of the destination side as mark sheet image data.

Figure 35:
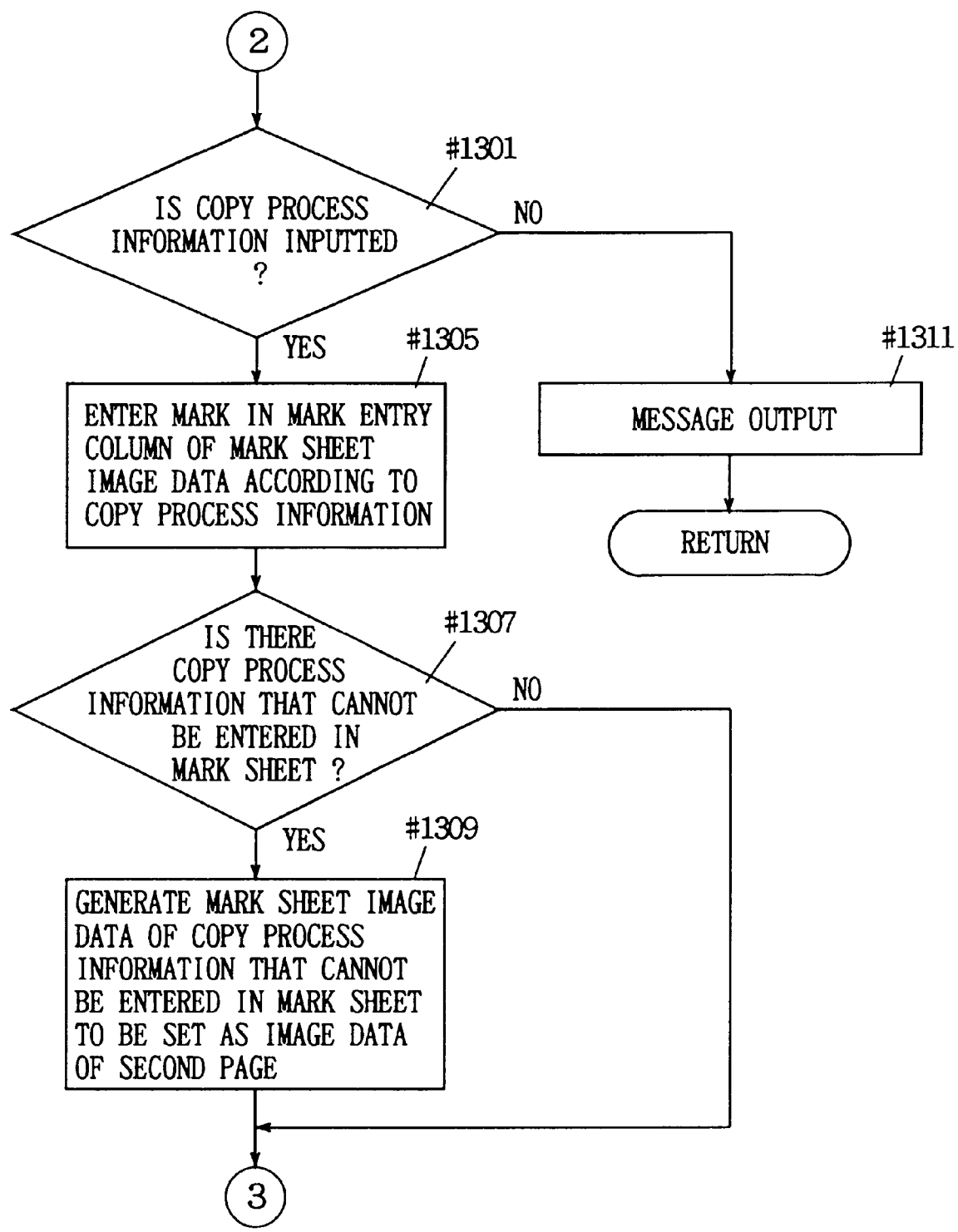
FIG. 35 is a flow chart showing partially a copy request control routine carried out by the facsimile apparatus according to a second embodiment of the present invention.

More specifically, the process of the flow chart of FIG. 35 is carried out in the facsimile apparatus of the second embodiment instead of the process of the flow chart of FIG. 21.

Since the steps of #725, #727, #729 and #733 in FIG. 21 correspond to the steps of #1301, #1305, #1307 and #1311, respectively, the description thereof will not be repeated.

At step #1309, mark sheet image data is produced according to the copy process information that cannot be entered into the mark sheet. The generated mark sheet image data is set as the image data of the second page.

Figure 26:
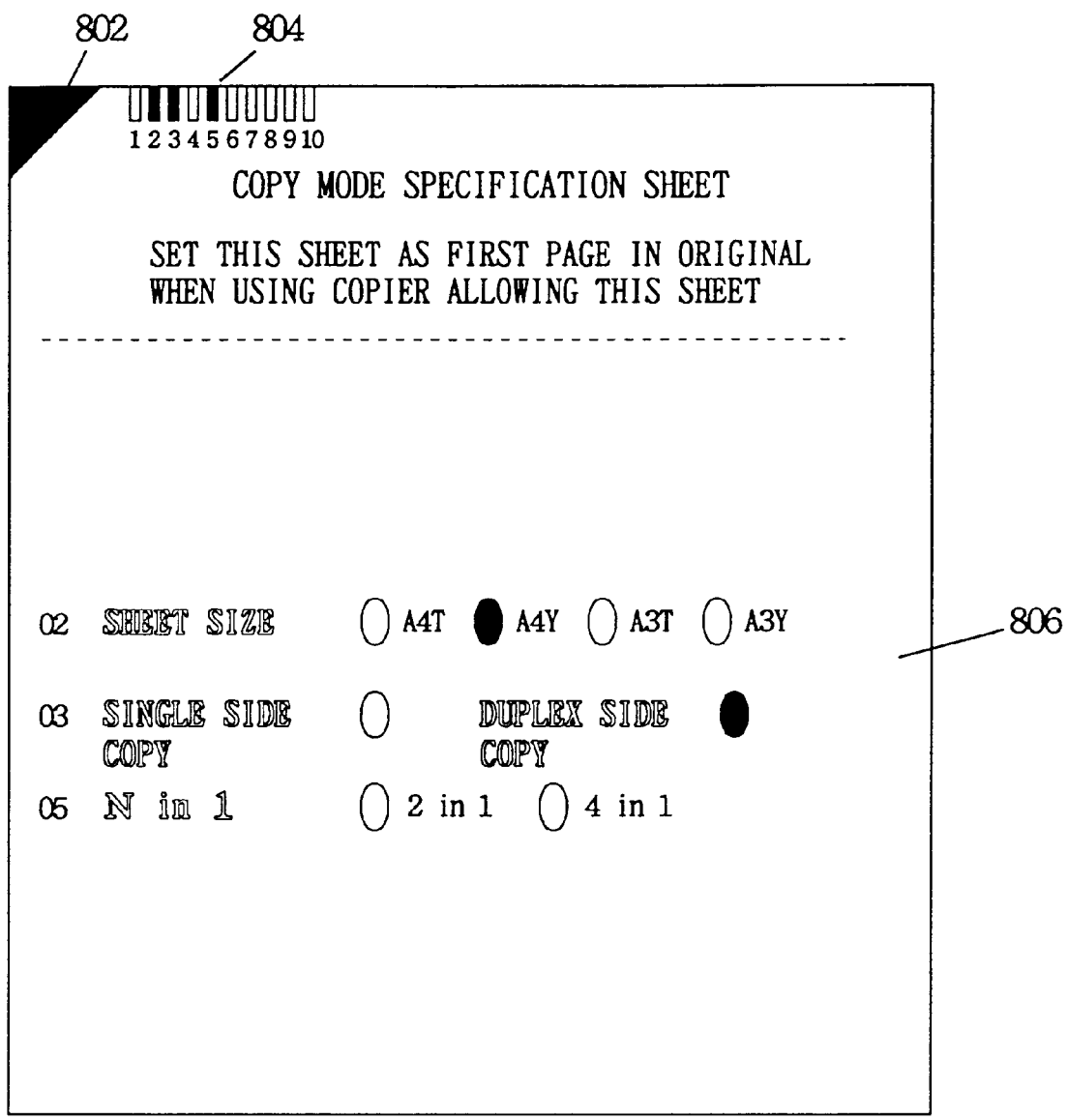
FIG. 26 shows a specific example of a mark sheet that is marked.
Figure 27A:
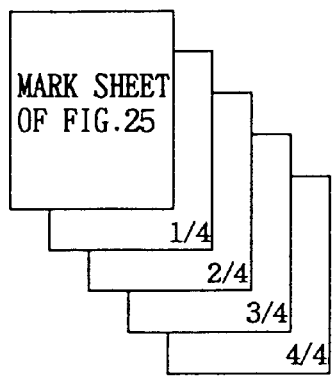
FIGS. 27a and 27b are diagrams for describing a process carried out at step #731 of FIG. 21.
Figure 27B:
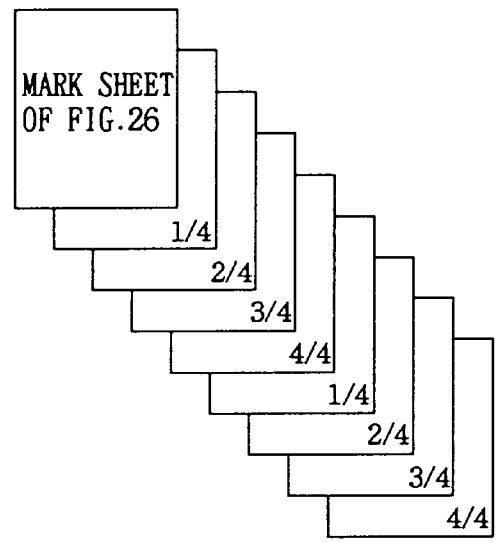
Figure 36:
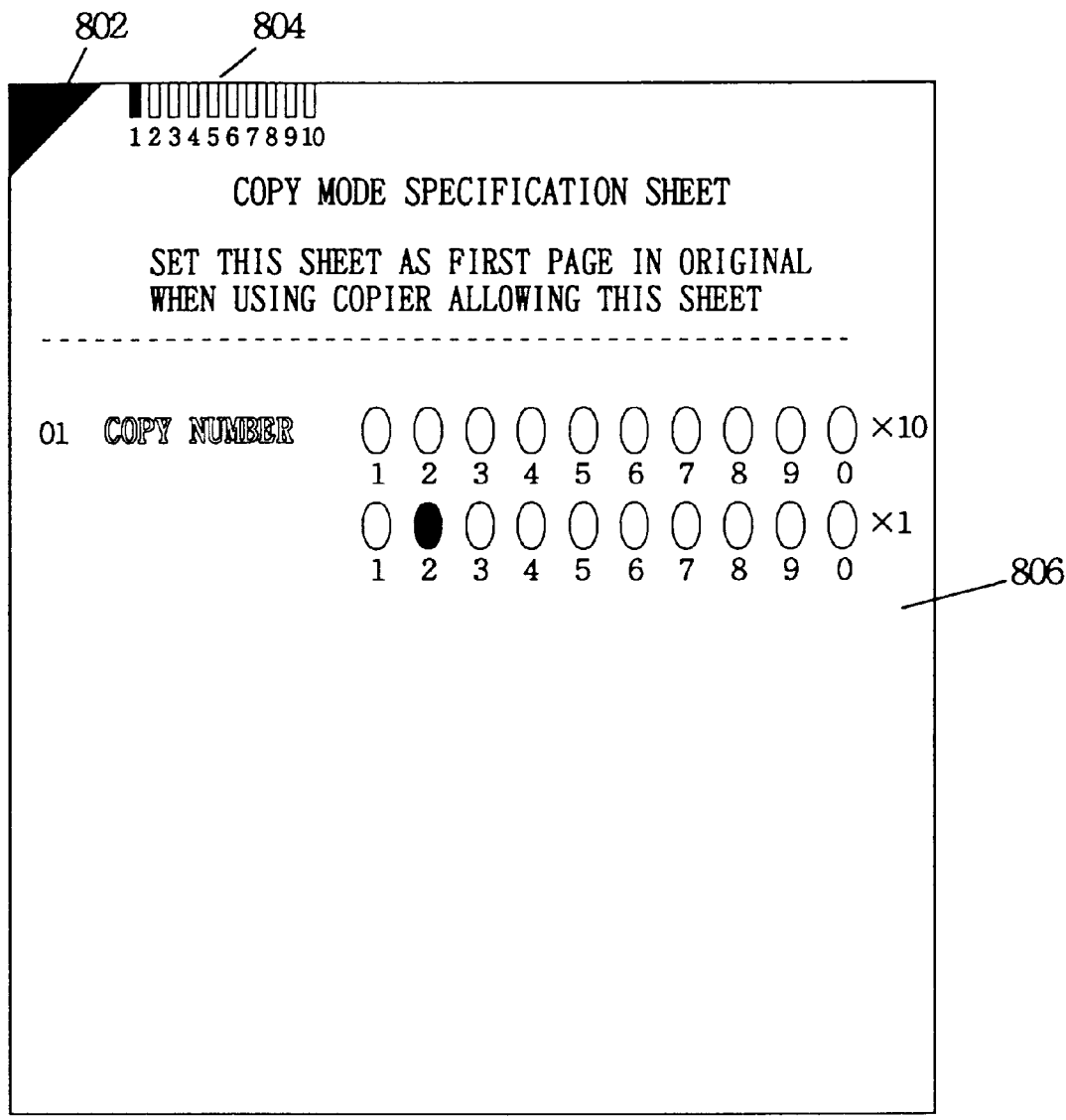
FIG. 36 is a diagram showing a specific example of a mark sheet produced at step #1309 of FIG. 35.
Figure 37A:
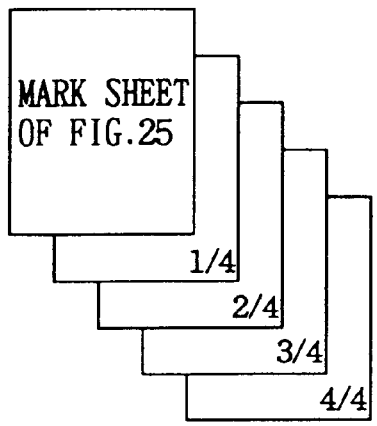
FIGS. 37a and 37b show examples of a process carried out at step #1309 of FIG. 35.
Figure 37B:
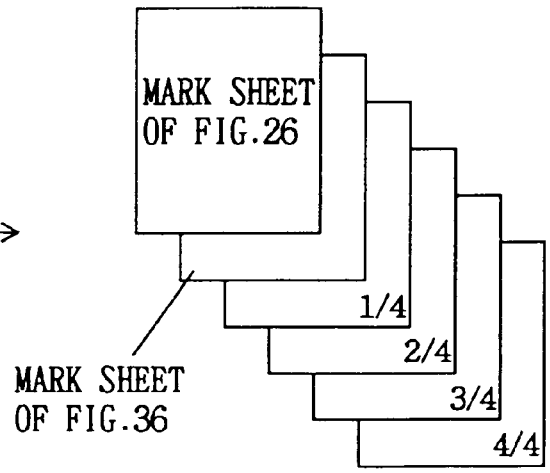

More specifically, when the copy process information of "copy number", "sheet size" and "duplex copy" of FIG. 23 is input, and when the mark sheet read out by the reader device includes only the items of "sheet size", "single side/duplex side copy" and "N in 1" of FIG. 25, only the copy process information that can be entered is written into the mark sheet image data obtained by read out to be set as image data of the first page as shown in FIG. 26. The information of the copy number that could not be written into the mark sheet shown in FIG. 25 is generated as mark sheet image data of a second page as shown in FIG. 36. When the originals with a mark sheet at the head page as shown in FIG. 37(a) are set in the reader device with copy process information that cannot be entered in the mark sheet, mark sheet image data according to the copy process information that cannot be entered is generated as image data of the second page as shown in FIG. 37(b). Then the image data of FIG. 37(b) is transmitted.

The receiver of the destination side can become aware of the copy process information that cannot be processed at the facsimile apparatus of the reception side by checking the information entered in the mark sheet of the second page. By copying the received original using another copying apparatus according to the contents of the mark sheet of the second page, the receiver can obtain the original image intended by the sender of the transmitting side.

THIRD EMBODIMENT

Figure 31:
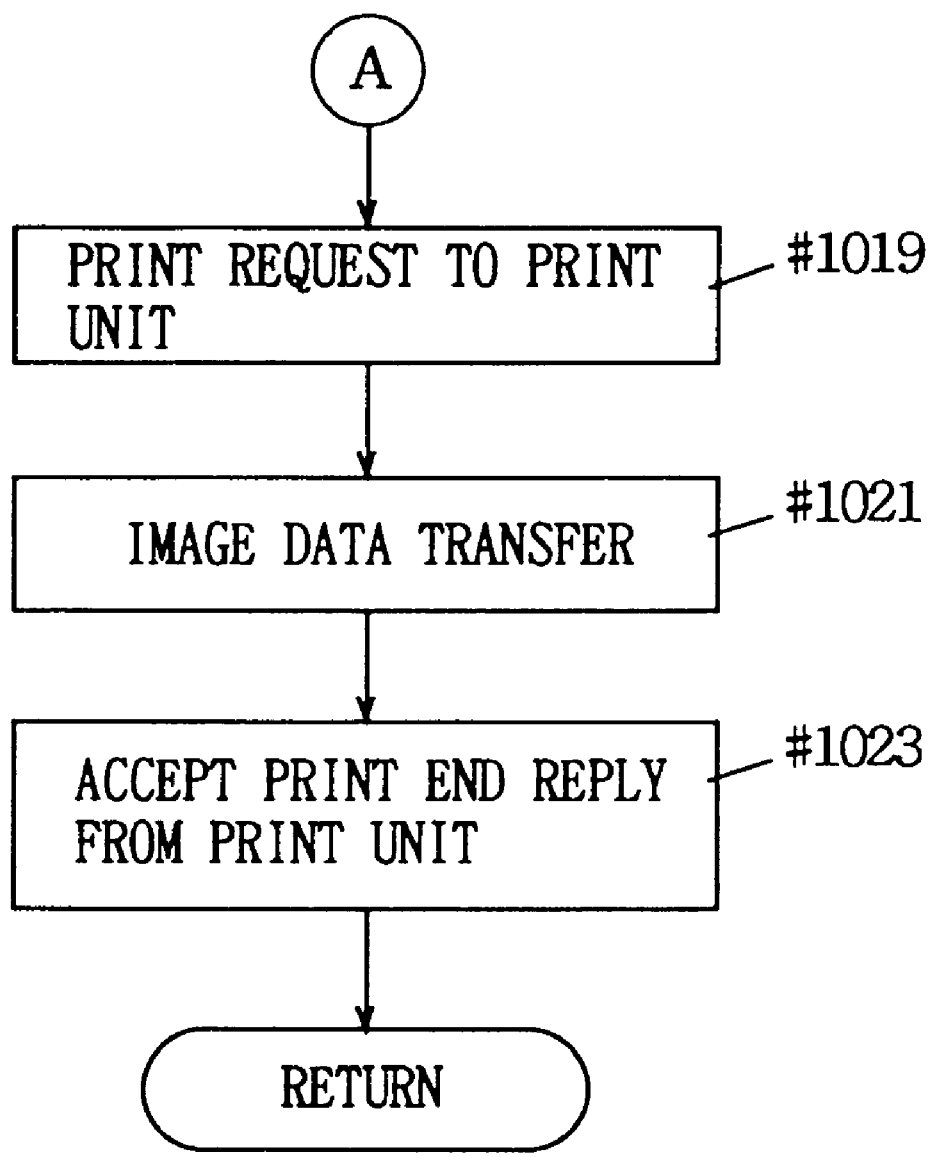
Figure 38:
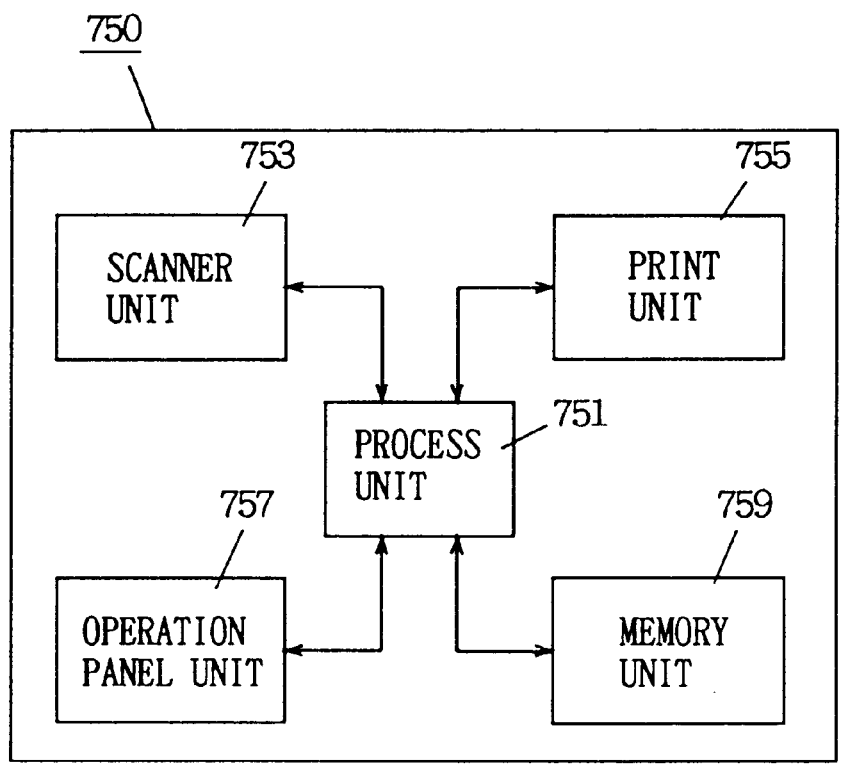
FIG. 38 is a block diagram showing a structure of a copying apparatus according to a third embodiment of the present invention.

FIG. 38 is a block diagram showing a structure of a copying apparatus according to a third embodiment of the present invention. Referring to FIG. 38, a copying apparatus 750 includes a processing unit 751 for providing entire control of the apparatus, a scanner unit 753 for reading out an original by scanning, a print unit 755 for printing out image data, a memory unit 759 for storing image data, and an operation panel unit 757 for receiving the specification of the copy number and copy request. The copy apparatus of FIG. 37 is characterized in that the processes shown in the flow charts of FIGS. 30 and 31 are carried out in copy control.

More specifically, when the head page of the original set at scanner unit 753 is a mark sheet, a copy mode according to the contents entered in the mark sheet is set. Copy operation is carried out according to the set copy mode.

In the copying apparatus of the present embodiment, a copy mode can be set using a mark sheet besides the setting through operation panel unit 757. Therefore, the usability of the copying apparatus is improved.

FOURTH EMBODIMENT

Figure 39:
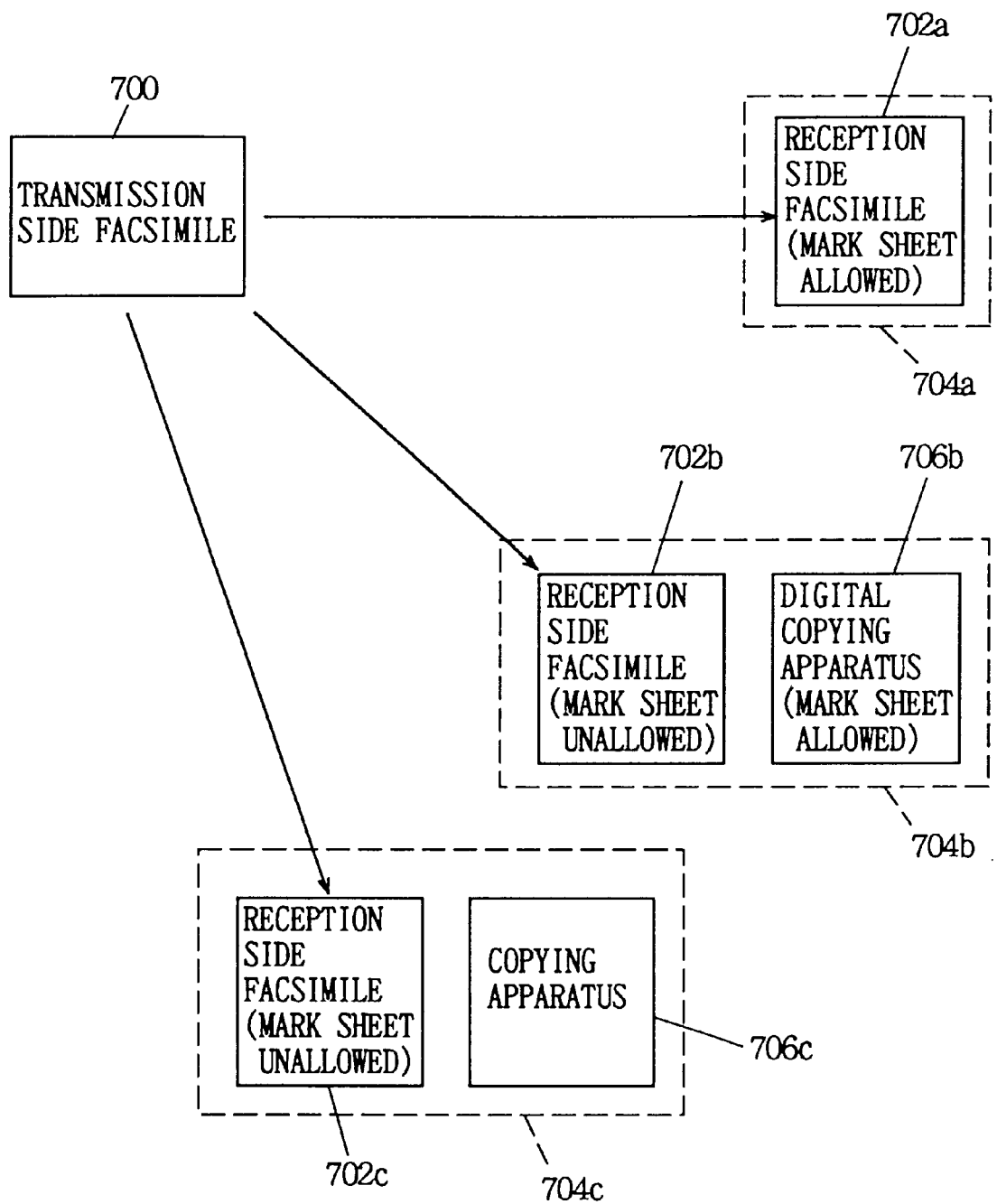
FIG. 39 shows a structure of a facsimile communication system apparatus according to a fourth embodiment of the present invention.

FIG. 39 is a block diagram showing the configuration of a facsimile communication system according to a fourth embodiment of the present invention.

Referring to FIG. 39, the facsimile communication system of the fourth embodiment includes the facsimile apparatus of the first embodiment as a facsimile apparatus 700 of a transmitting side, the facsimile apparatus of the second embodiment as a facsimile apparatus 702*a* of a receiving side, and conventional facsimile apparatuses 702*b* and 702*c* of a receiving side that cannot read out a mark sheet.

In the environment 704*b* in which receiver-facsimile apparatus 702*b* is located, a copying apparatus 706*b* of the third embodiment is present. Also, in the environment 704*c* in which receiver-facsimile apparatus 702*c* is located, a general copying apparatus 706*c* that cannot identify a mark sheet is present.

A case is considered where the image data stored in transmitter-facsimile apparatus 700 is that shown in FIG. 27(*a*), i.e. the first page is the mark sheet image data for a copy request, and the following four pages are original image data. The image data of FIG. 27(*a*) is transmitted to each of receiver-facsimile apparatuses 702*a*–702*c*. At facsimile apparatus 702*a* of the receiving side, image data of the mark sheet is not printed out since that mark sheet image data can be identified. The four sheets of original image data are subjected to a copy process according to the copy control information entered in the mark sheet.

At facsimile apparatuses 702*b* and 702*c* of the receiver side, the transmitted image data is directly printed out including the mark sheet since these apparatuses do not have the capability of identifying the mark sheet.

The receiver of the facsimile image data in the environment 704*b* sets the received originals at copying apparatus 706*b* and specifies a copy request. The process of the copying apparatus of the third embodiment is carried out to effect a copy operation exactly according to the information entered in the mark sheet. Thus, the receiver at the environment 704*b* can obtain an image required by the sender of the facsimile transmission.

The receiver of the original image in the environment 704*c* can confirm the contents of the copy intended by the sender of the transmission side by identifying the contents of the mark sheet from the image including the mark sheet.

The contents identified by the receiver in environment 704*c* is manually input at copying apparatus 706*c* in that environment to carry out copying. Thus, the receiver in environment 704*c* can obtain the image intended by the sender of the transmitting side.

Figure 40:
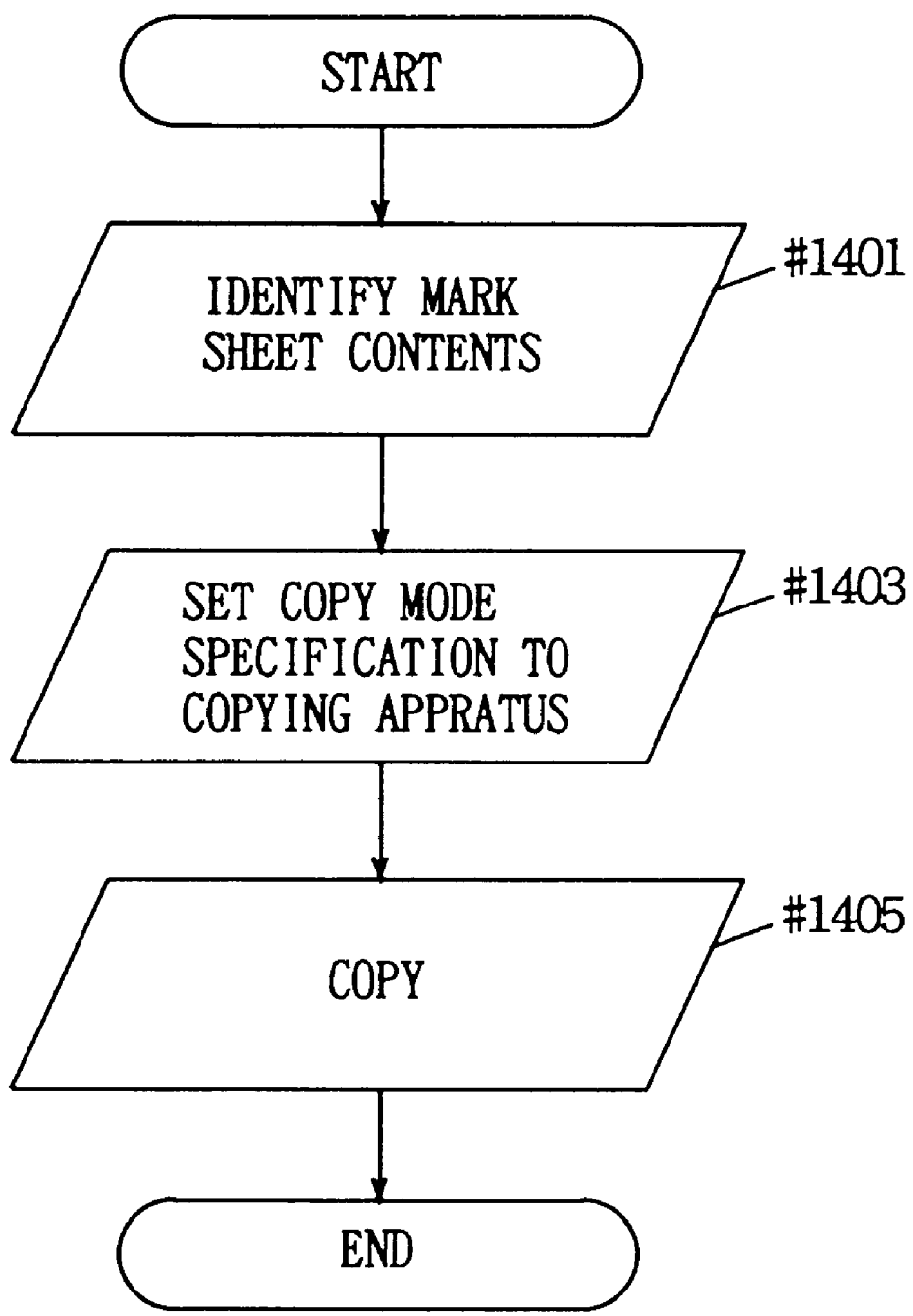
FIG. 40 is a flow chart showing a process carried out by an operator within the environment 704c of FIG. 38.

The procedure carried out by the receiver in environment 704*c* will be described specifically according to the flow chart of FIG. 40.

At step #1401, the receiver in environment 704*c* identifies the copy contents intended by the sender of the transmitting side from the printed mark sheet.

At step #1403, the receiver in environment 704*c* specified the copy mode at copying machine 706*c* according to the identified contents of the mark sheet.

At step #1405, the original output from facsimile apparatus 702*c* is copied according to the set copy mode.

Thus, the image data intended by the sender of the transmission via transmission-facsimile apparatus 700 can be properly reproduced at the receiver side independent of the function incorporated in the facsimile apparatus of the receiver side.

Figure 41:
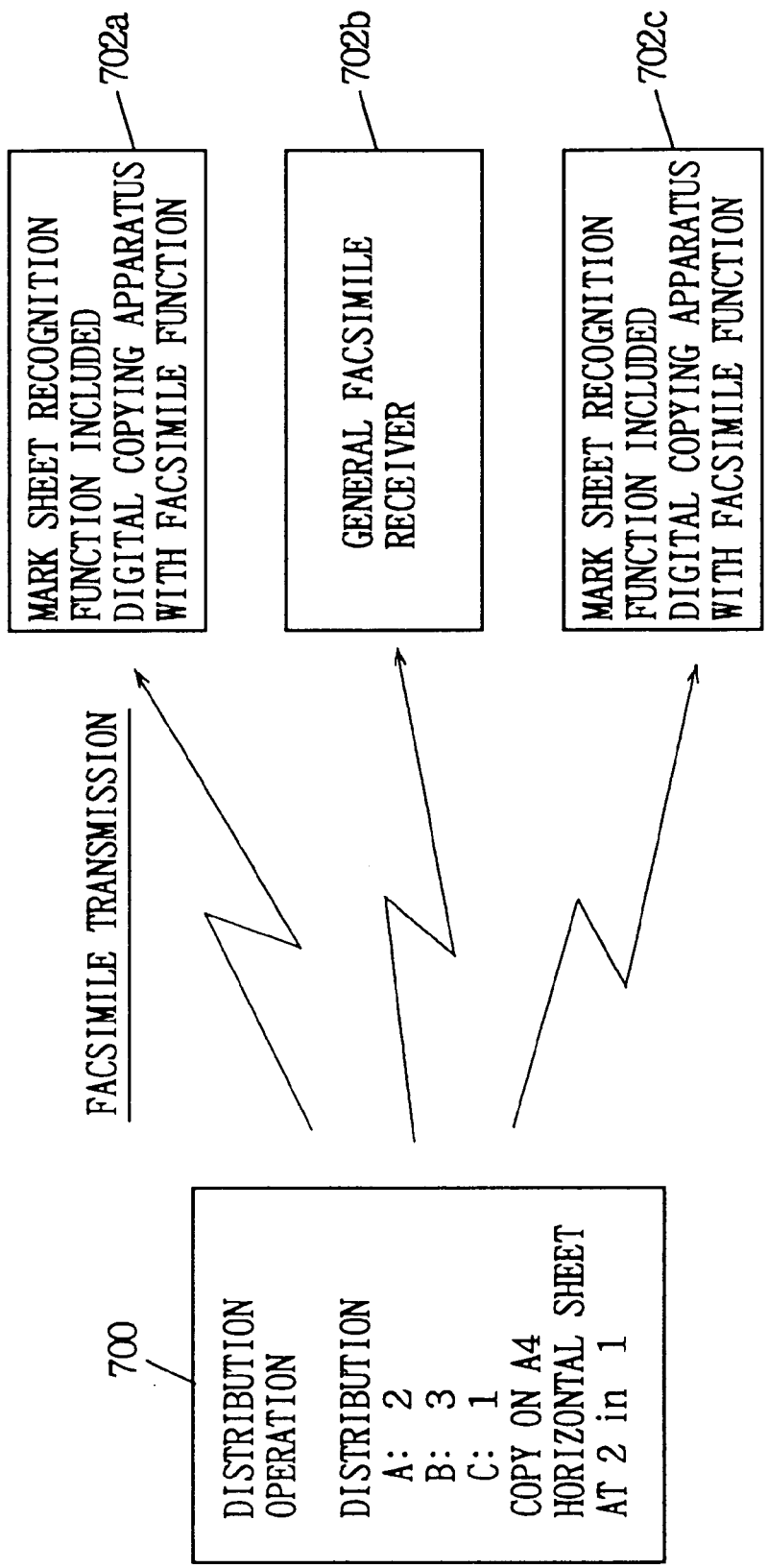
FIG. 41 is a block diagram showing a modification of the facsimile communication system of the fourth embodiment.

Furthermore, as shown in FIG. 41, copy control information such as the number of copies and sheet size for the copy can be set corresponding to each of receiver facsimile apparatuses 702*a*–702*c* at transmitter-facsimile apparatus 700 in effecting a copy request.

For example, two copies of the original can be set for receiver-facsimile apparatus 702*a*, three copies can be set for receiver-facsimile apparatus 702*b*, and one copy can be set for receiver-facsimile apparatus 702*c* at facsimile apparatus 700 of the transmission side. Thus, a copy process corresponding to the requirement of the sender can be carried out at the facsimile apparatus of the receiving side.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus that allows image communication with an external image processing apparatus, comprising:

means for storing function information of image process of said external image processing apparatus, means for entering information of image process to be applied on original image data to be transmitted to said external image processing apparatus, image processing means for comparing said entered information with the function information of said external image processing apparatus and for image-processing said original image data according to information of image process that cannot be processed by said external image processing apparatus out of said entered information, and transmission means for transmitting image-processed original image data and information of image process that can be carried out by said external image processing apparatus to said external image processing apparatus.

2. The image processing apparatus according to claim 1, wherein said transmission means transmits said entered information of image process as image data.

3. The image processing apparatus according to claim 1, further comprising means for obtaining function information of image process of said external image processing apparatus through communication.

4. The image processing apparatus according to claim 2, further comprising means for obtaining function information of image process of said external image processing apparatus through communication.

5. The image processing apparatus according to claim 2, wherein said image data is mark sheet data.

6. An image processing apparatus that allows image communication with an external image processing apparatus, comprising:

memory means for storing function information of image process of said external image processing apparatus, means for entering information of image process to be applied on original image data to be transmitted to said external image processing apparatus, means for comparing said entered information and the function information of said external image processing apparatus and for producing image data according to information of image process that cannot be processed by said external image processing apparatus out of said entered information, and transmission means for transmitting said produced image data, said original image data, and said entered information to said external image processing apparatus.

7. The image processing apparatus according to claim 6, wherein said entered information includes a plurality of information, and said transmission means transmits information out of said plurality of entered information that can be processed by said external image processing apparatus to said external image processing apparatus.

8. The image processing apparatus according to claim 6, wherein said produced image data is of a mark sheet format.

9. An image processing system that allows communication between a first image processing apparatus and a second image processing apparatus, said first image processing apparatus comprising:

means for obtaining function information of image process of said second image processing apparatus through communication, means for entering information of image process to be applied on original image data to be transmitted to said second image processing apparatus, means for comparing said entered information with function information of said second image processing apparatus and for producing image data according to information out of said entered information that cannot be processed by said second image processing apparatus, and transmission means for transmitting said original image data, said produced image data, and information that cannot be processed by said second image processing apparatus out of said entered information to said second image processing apparatus, said second image processing apparatus comprising:

image processing means for image-processing said original image data according to information transmitted by said first image processing apparatus, and means for providing said image-processed original image data and said produced image data.

10. The image processing system according to claim 9, wherein said produced image data is of a mark sheet format.

11. A facsimile apparatus of a transmission side that allows image communication with a facsimile apparatus of a reception side comprising:

means for storing function information of image process of said facsimile apparatus of a reception side, means for entering information of image process to be applied on original image data to be transmitted to said facsimile apparatus of a reception side, image processing means for image-processing said original image data according to entered information and function information of said facsimile apparatus of a reception side, and transmission means for transmitting said image-processed original image data to said facsimile apparatus of a reception side.

12. A facsimile apparatus of a transmission side that allows image communication with a facsimile apparatus of a reception side comprising:

means for storing function information of image process of said facsimile apparatus of a reception side, means for entering information of image process to be applied on original image data to be transmitted to said facsimile apparatus of a reception side, means for comparing said entered information with function information of said facsimile apparatus of a reception side and for image-processing said original image data according to information of image process that cannot be processed by said facsimile apparatus of a reception side out of said entered information, and transmission means for transmitting said image-processed original image data and information of image process that can be processed by said facsimile apparatus of a reception side to said facsimile apparatus of the reception side.

13. A facsimile apparatus of a transmission side that allows image communication with a facsimile apparatus of a reception side, comprising:

memory means for storing function information of image process of said facsimile apparatus of a reception side, means for entering information of image process to be applied on original image data to be transmitted to said facsimile apparatus of a reception side, means for comparing said entered information with function information of said facsimile apparatus of a reception side and for producing image data according to information of image process that cannot be processed by said facsimile apparatus of a reception side out of said entered information, and transmission means for transmitting said produced image data, said original image data, and said entered information to said facsimile apparatus of a reception side.

14. An image processing system that allows communication between a first facsimile apparatus and a second facsimile apparatus, said first facsimile apparatus comprising:

means for obtaining function information of image process of said second facsimile apparatus through communication, means for entering information of image process to be applied on original image data to be transmitted to said second facsimile apparatus, means for comparing said entered information with function information of said second facsimile apparatus and for producing image data according to information of image process that cannot be processed by said second facsimile apparatus out of entered information, and transmission means for transmitting said original image data, said produced image data, and information of image process that cannot be processed by said second facsimile apparatus out of said entered information, said second facsimile apparatus comprising:

image processing means for image-processing said original image data according to information transmitted by said first facsimile apparatus, and means for providing said image-processed original image data and said produced image data.

15. An image processing apparatus that allows image communication with an external image processing apparatus, comprising:

memory means for storing function information of image process of said external image processing apparatus, instructing means for instructing that a plurality of copies of original image data to be transmitted to said external image processing apparatus are to be printed out, means for determining whether a plurality of copies of print out can be executed by said external image processing apparatus according to function information of said external image processing apparatus, and, if unexecutable, generating image data to notify an operator at said external processing apparatus side that a plurality of copies of print outs are required, and transmission means for transmitting said generated image data and said original image data to said external image processing apparatus.

16. The image processing apparatus according to claim 15, wherein said external image processing apparatus and said image processing apparatus are facsimile apparatuses.

17. The image processing apparatus according to claim 15, wherein said generated image data includes mark sheet data.

18. The image processing apparatus according to claim 16, wherein said generated image data is mark sheet data.

19. An image communication method comprising the steps of:

storing image processing function included in an external image processing apparatus, entering information of image process to be applied on original image data to be transmitted to said external image processing apparatus, comparing said entered information with said stored image processing function, specifying information of image process that cannot be processed by said external image processing apparatus out of said entered information according to said comparison result, image-processing said original image data according to said specified information, and transmitting said image-processed original image data and information of image process that can be processed by said external image processing apparatus to said external image processing apparatus.

20. An image communication method comprising the steps of:

storing image processing function included in an external image processing apparatus, accepting an instruction to print out a plurality of copies of original image data to be transmitted to said external image processing apparatus, determining whether a plurality of copies of said original image data can be printed out by said external image processing apparatus according to said stored image processing function, generating image data for informing an operator at said external image processing apparatus side that a plurality of copies of print outs are required when the determination at said determination step is negative, and transmitting said generated image data and said original image data to said external image processing apparatus.

* * * * *